United States Patent
Papa et al.

(10) Patent No.: US 10,044,654 B2
(45) Date of Patent: Aug. 7, 2018

(54) OPERATING A MATCH COOPERATIVE WITHOUT HANDLING PERSONALLY IDENTIFIABLE INFORMATION

(71) Applicant: ORACLE INTERNATIONAL CORPORATION, Redwood Shores, CA (US)

(72) Inventors: Stephen John Papa, San Jose, CA (US); David Abraham Wiener, Cupertino, CA (US); Stephen Streich, Toronto (CA); Taha Sheikh, Mississauga (CA)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 363 days.

(21) Appl. No.: 14/736,614

(22) Filed: Jun. 11, 2015

(65) Prior Publication Data
US 2016/0127289 A1 May 5, 2016

Related U.S. Application Data

(60) Provisional application No. 62/072,922, filed on Oct. 30, 2014.

(51) Int. Cl.
G06F 15/16 (2006.01)
H04L 12/58 (2006.01)
G06Q 30/02 (2012.01)

(52) U.S. Cl.
CPC ......... H04L 51/12 (2013.01); G06Q 30/0255 (2013.01); G06Q 30/0269 (2013.01); G06Q 30/0277 (2013.01)

(58) Field of Classification Search
CPC .......... G06Q 30/0615; G06Q 30/0251; G06Q 30/0255; G06Q 30/0269; G06Q 30/0277; H04L 51/12
See application file for complete search history.

(56) References Cited

U.S. PATENT DOCUMENTS

| 2007/0156638 A1* | 7/2007 | Vadekar | ................... G06F 21/57 |
| 2011/0060905 A1* | 3/2011 | Stack | ..................... G06Q 10/10 713/167 |

(Continued)

OTHER PUBLICATIONS

Ad Ops Insider, "Data Management Part IV: Syncing Offline Data to Your DMP", Jul. 22, 2011, 3 page URL http://www.adopsinsider.com/oline-ad-measurement-tracking/data-management-platforms/data-rnanagement-part-iv-syncing-offline-data-to-your-dmp/.

(Continued)

*Primary Examiner* — Arvin Eskandarnia
*Assistant Examiner* — Austin Moreau
(74) *Attorney, Agent, or Firm* — Kilpatrick Townsend & Stockton LLP

(57) ABSTRACT

The present disclosure provides a detailed description of techniques used in systems, methods, and in computer program products for building and operating a match cooperative without handling personally identifiable information. The various embodiments address the problem of discovering attributes pertaining to a particular user without sharing personally identifiable information pertaining to that particular user. More specifically, the claimed embodiments are directed to approaches for receiving online and offline PII and NPII associated with various users, obfuscating (e.g., hashing) the PII, and matching the obfuscated PII to the NPII based on various data (e.g., common attributes, etc.) and methods (e.g., deterministic matching, probabilistic matching, etc.). The matched NPII attributes can then be used to target the user associated with the obfuscated PII in online advertising campaigns.

26 Claims, 15 Drawing Sheets

| ID | Source | Hash1 | Hash2 | IP Address | Attribute1 | Attribute2 |
|---|---|---|---|---|---|---|
| ABC | DP1 | H1zyx | H2yxz | null | null | null |
| DEF | DP2 | H1zyx | null | IP123 | null | null |
| GHI | DP3 | null | null | IP123 | Auto | Retail |
| XYZ | DPN | null | null | IP999 | Travel | Retail |

Match 223
Match 224

(56) References Cited

U.S. PATENT DOCUMENTS

| | | | |
|---|---|---|---|
| 2011/0099202 A1* | 4/2011 | Dedeoglu | G06F 17/30702 707/780 |
| 2013/0332987 A1* | 12/2013 | Tenneti | G06F 21/10 726/1 |
| 2015/0081565 A1* | 3/2015 | Roullier | G06Q 30/0242 705/64 |
| 2016/0110775 A1* | 4/2016 | Moiz | G06Q 30/0277 705/14.73 |
| 2016/0142379 A1 | 5/2016 | Tawakol et al. | |

OTHER PUBLICATIONS

Chris O'Hara, iMedia Connection, "Matching Offline Date for Online Targeting", Jan. 3, 2013, 3 pages URL http://blogs.imediaconnection.com/bldg/2013/01/03/matching-offline-data-for-online-targeting/.

Dan Scudder, LiveRamp, "A Primer on Data Onboarding", Aug. 22, 2012, 3 pages URL http://liveramp.com/blog/a-primer-on-data-onboarding/.

Jeremy Lizt, LiveRamp, "Data Onboarding System Overview", Oct. 3, 2012, 2 pages URL http://blog.liveramp.com/2012/10/03/data-onboarding-system-overview/.

\* cited by examiner

OPERATING A MATCH COOPERATIVE WITHOUT HANDLING PERSONALLY IDENTIFIABLE INFORMATION

RELATED APPLICATIONS

The present application claims the benefit of priority to U.S. Patent Application Ser. No. 62/072,922, entitled "METHOD FOR MATCHING USER ATTRIBUTES WITHOUT HANDLING PERSONALLY IDENTIFIABLE INFORMATION", filed Oct. 30, 2014, which is hereby incorporated by reference in its entirety.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD

This disclosure relates to the field of Internet advertising, and more particularly to techniques for operating an information-sharing cooperative that shares information between co-op participants without handling personally identifiable information.

BACKGROUND

Online and mobile advertisers want to know as much as possible about online and mobile device users so as to prosecute effective and sometime narrowly-targeted advertising campaigns. The Internet online advertising ecosystem has evolved to where a significant amount of personally identifiable information (e.g., email address, phone number, etc.) and non-personally identifiable information (e.g., gender, age, buying interests, etc.) about online users are collected on a daily basis. However, sets of personally identifiable information and sets of non-personally identifiable information from the same online user are not always associated or "matched", and advertising opportunities are missed. For example, an advertiser that only knows some personally identifiable information (e.g., email address) of a user, would not necessarily be able to target that user against all attributes in the non-personally identifiable information profile of that same user. Further, privacy regulatory organizations have also established rules regarding treatment of personally identifiable information. For example, severe restrictions often exist with regards to data that includes personally identifiable information (e.g., data that can be associated to specific individuals), as opposed to non-personally identifiable information (e.g., data collected in an anonymous or non-personally identifiable information environment such as mobile browsing, online browsing, physical-location capture, etc.).

Legacy approaches have data aggregators working with owners of offline personally identifiable information (e.g., purchase data, coupon use data, customer relationship management (CRM) data, etc.) to match non-personally identifiable information data to the personally identifiable information. However, such legacy approaches involve the handling of personally identifiable information and such legacy approaches raise compliance and privacy issues, limiting the usefulness of such legacy techniques. Further, due, in part, to privacy compliance requirements and reliance on offline data, legacy matching approaches rely on offline data that is handled in a batch file exchange process. It can take several days or even weeks to complete a match cycle using offline data.

Therefore, there is a need for improved approaches to addresses the aforementioned problems.

SUMMARY

The present disclosure provides improved systems, methods, and computer program products suited to share matches without violating any privacy expectations. More specifically, the present disclosure provides a detailed description of techniques used in systems, methods, and in computer program products for building and operating a match cooperative without handling personally identifiable information. The various embodiments address the problem of discovering attributes pertaining to a particular user without sharing personally identifiable information pertaining to that particular user. Certain embodiments are directed to technological solutions for matching non-personally identifiable information from a user with obfuscated personally identifiable information from the same user, which embodiments advance the technical fields for addressing the problem of discovering attributes pertaining to a particular user without sharing personally identifiable information pertaining to that particular user, as well as advancing peripheral technical fields. The disclosed embodiments modify and improve over conventional approaches. In particular, practice of the disclosed techniques reduces use of computer memory, reduces demand for computer processing power, and reduces or eliminates batch processing overhead. Some embodiments disclosed herein use techniques to improve the functioning of multiple systems within the disclosed environments.

Further details of aspects, objectives, and advantages of the disclosure are described below and in the detailed description, drawings, and claims. Both the foregoing general description of the background and the following detailed description are exemplary and explanatory, and are not intended to be limiting as to the scope of the claims.

BRIEF DESCRIPTION OF THE DRAWINGS

The drawings described below are for illustration purposes only. The drawings are not intended to limit the scope of the present disclosure.

DETAILED DESCRIPTION

Figure 1A:
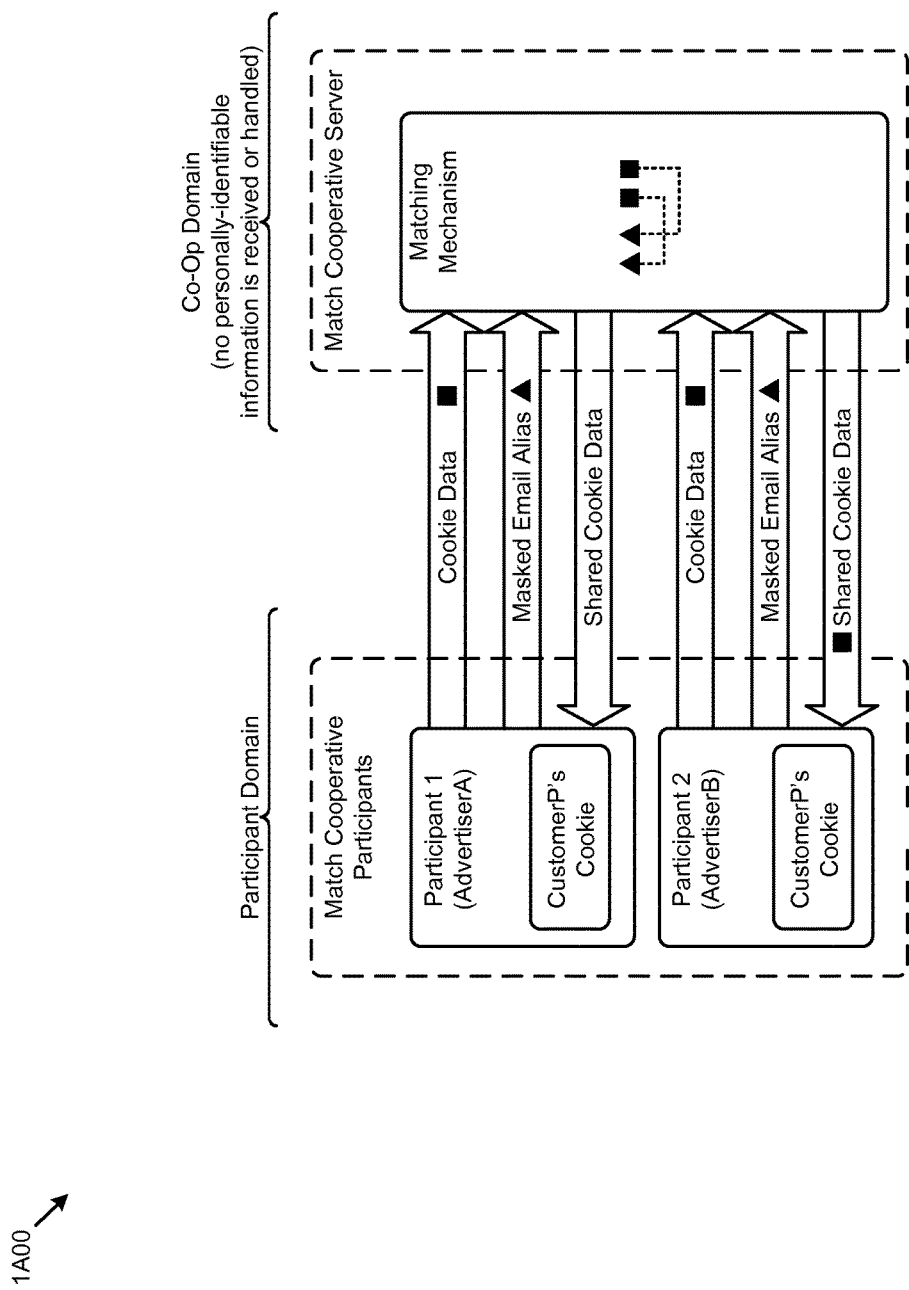
FIG. 1A depicts an environment illustrating an online match cooperative enabled by sharing cookie data pertaining to the same customer by matching masked representations of the same customer's email alias, according to an embodiment.

Some embodiments of the present disclosure address the problem of discovering attributes pertaining to a particular user without sharing personally identifiable information (PII) pertaining to that particular user. Some embodiments are directed to approaches for matching information pertaining to a user with other information pertaining to the same user, yet without divulging personally-identifiable information in the course of the matching. Disclosed herein and in the accompanying figures are exemplary environments, systems, methods, and computer program products for building and operating a match cooperative without handling personally identifiable information.

Overview

Online and mobile advertisers want to know as much as possible about online and mobile device users so as to prosecute targeted advertising campaigns. The online advertising ecosystem has evolved to where a significant amount of PII (e.g., email address, phone number, etc.) and NPII (e.g., gender, age, buying interests, etc.) about online users are collected on a daily basis. However, in various scenarios (see below), sets of PII and sets of NPII from the same online user are not always tied together, so advertising opportunities might be missed. A cooperative such as the match cooperative herein disclosed can reduce or eliminate such missed opportunities.

Strictly as one example scenario, consider an advertiser, advertiserA, that has regular, but relatively infrequent (e.g., monthly, at the beginning of the month) online visits by their customers. Further consider another advertiser, advertiserB, that also has regular, but relatively infrequent (e.g., monthly, at the middle of the month) online visits by their customers. Still further consider that advertiserA and advertiserB have some customers in common. In this scenario a customer common between that advertiserA and advertiserB might update his or her cookie when interacting with respect to advertiserA (e.g., in the beginning of the month), and might later interacting with respect to advertiserB (e.g., in the middle of the month). Both advertiserA and advertiserB have personally-identifiable information such as an email alias, however neither advertiserA nor advertiserB can share personally-identifiable information with the other advertiser. A match cooperative can be constructed to facilitate sharing of NPII customer data (e.g., cookie data), yet without dissemination or sharing PII data such as their common customers' email aliases.

To address the need to tie the NPII and PII of a given user without handling the PII, the techniques described herein use an obfuscated (e.g., securely encoded) representation of the PII provided by the PII owner (e.g., online shopping website). By using an obfuscated representation of the PII, the privacy of the user associated with the PII is protected, and yet an unlimited extent of NPII associated with that user (e.g., from online cookies) can be mapped back to the obfuscated PII and used for targeted online advertising campaigns.

Improved techniques to share information is needed. More specifically, techniques are needed to address the problem of discovering attributes pertaining to a particular user without sharing personally identifiable information. The sought-after capabilities can be achieved by application of the herein-disclosed techniques for building and operating a match cooperative.

In some embodiments, matching non-personally identifiable information from a user (e.g., from a cookie) with obfuscated personally identifiable information (e.g., hashed email) from the same user can be implemented by receiving NPII and obfuscated representations of online and offline PII associated with various users, and matching the obfuscated PII to the NPII based on various data (e.g., common attributes, etc.) and methods (e.g., deterministic matching, probabilistic matching, etc.). The matched NPII attributes can then be used to target the user associated with the obfuscated PII in both online and offline advertising campaigns.

Various embodiments are described herein with reference to the figures. It should be noted that the figures are not necessarily drawn to scale and that the elements of similar structures or functions are sometimes represented by like reference numerals throughout the figures. It should also be noted that the figures are only intended to facilitate the description of the disclosed embodiments—they are not representative of an exhaustive treatment of all possible embodiments, and they are not intended to impute any limitation as to the scope of the claims. In addition, an illustrated embodiment need not portray all aspects or advantages of usage in any particular environment. An aspect or an advantage described in conjunction with a particular embodiment is not necessarily limited to that embodiment and can be practiced in any other embodiments even if not so illustrated. Also, reference throughout this specification to "some embodiments" or "other embodiments" means that a particular feature, structure, material, or characteristic described in connection with the embodiments is included in at least one embodiment. Thus, the appearances of the phrase "in some embodiments" or "in other embodiments" in various places throughout this specification are not necessarily referring to the same embodiment or embodiments.

Definitions

Some of the terms used in this description are defined below for easy reference. The presented terms and their respective definitions are not rigidly restricted to these definitions—a term may be further defined by the term's use within this disclosure. The term "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application and the appended claims, the term "or" is intended to mean an inclusive "or" rather than an exclusive "or". That is, unless specified otherwise, or is clear from the context, "X employs A or B" is intended to mean any of the natural inclusive permutations. That is, if X employs A, X employs B, or X employs both A and B, then "X employs A or B" is satisfied under any of the foregoing instances. As used herein, at least one of A or B means at least one of A, or at least one of B, or at least one of both A and B. In other words, this phrase is disjunctive. The articles "a" and "an" as used in this application and the appended claims should generally be construed to mean "one or more" unless specified otherwise or is clear from the context to be directed to a singular form.

Reference is now made in detail to certain embodiments. The disclosed embodiments are not intended to be limiting of the claims.

Descriptions of Exemplary Embodiments

FIG. 1A depicts an environment 1A00 illustrating an online match cooperative enabled by sharing cookie data pertaining to the same customer by matching masked representations of the same customer's email alias. The environment 1A00 includes a network for exchanging electronic data records and (as shown) a match cooperative server. In operation, the match cooperative server receives a data record from a first participant (e.g., over a first network port) and the data record includes a masked representation of a customer's email alias. The first participant also sends cookie data pertaining to the customer associated with the email alias. A second participant also sends a data record, where the second data record also includes a masked representation of the email alias. The second data record includes a second set of cookie data (e.g., updated cookie data), The shown match cooperative server invokes one or more matching mechanisms to determine an equivalence between the masked representations of the email alias and associates the cookie data received from the second participant (e.g., updated cookie data) with the data record received from the first participant, and sends cookie data to the first participant.

The first participant can receive shared cookie data that was formerly known only to the second participant. The exchange can continue over time such that the second participant can receive shared cookie data that was formerly known only to the first participant. This can be accomplished continuously. The match cooperative server never receives email aliases that are not masked. So long as the first participant and the second participant share a customer (e.g., a customer that has the same email alias or other personally identifiable information), and so long as first participant and the second participant share use the same masking techniques, the equivalence between masked representations of a customer's email alias or other masked IDs can be determined by the match cooperative. Other cases involving data other than cookie data, and other cases involving various forms of masked PII information are discussed hereunder.

Figure 1B:
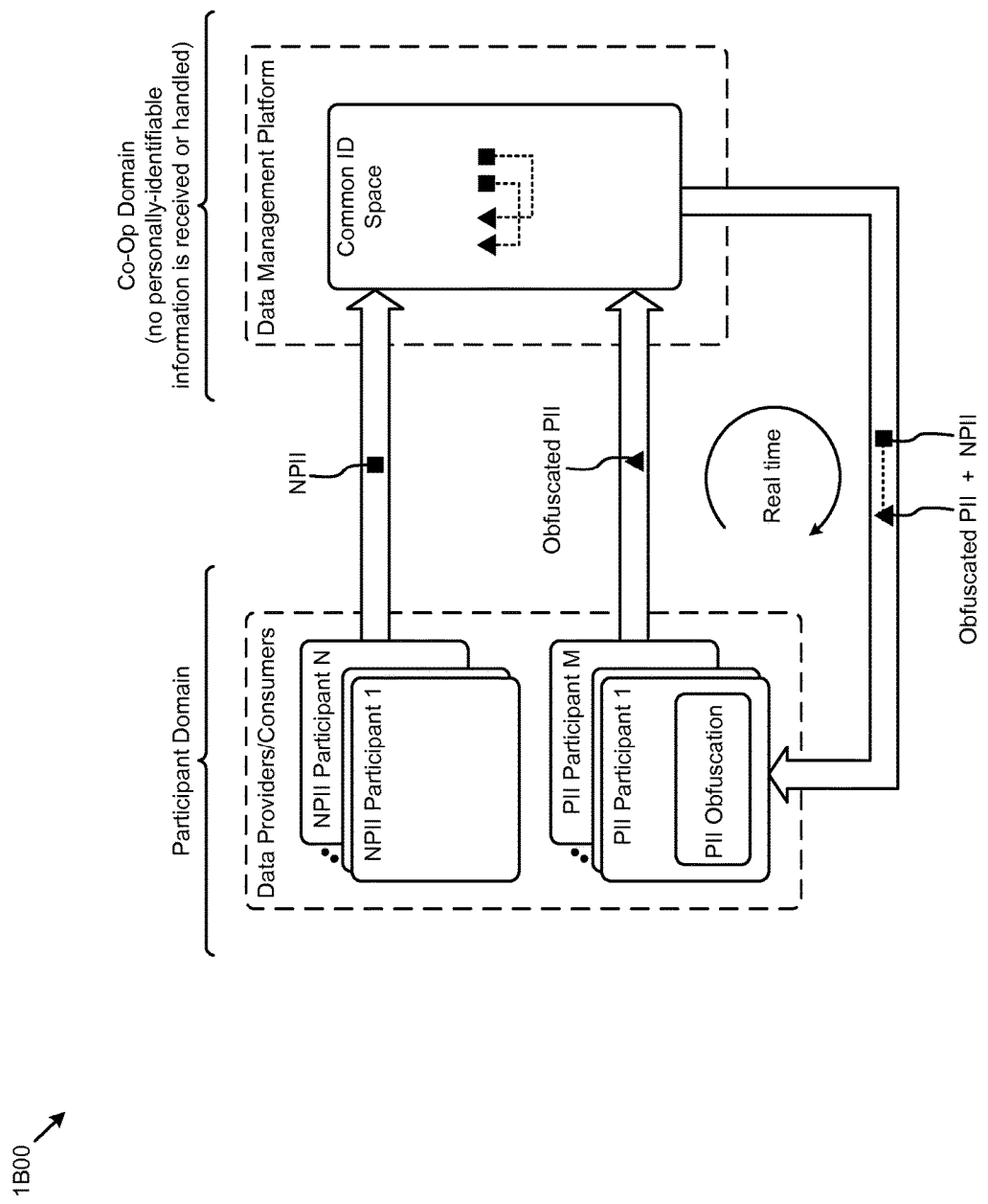
FIG. 1B depicts an environment illustrating an online match cooperative enabled by matching user attributes without handling personally identifiable information.

FIG. 1B depicts an environment 1B00 illustrating an online match cooperative enabled by matching user attributes without handling personally identifiable information. As an option, one or more instances of environment 1B00 or any aspect thereof may be implemented in the context of the architecture and functionality of the embodiments described herein. Also, the environment 1B00 or any aspect thereof may be implemented in any desired environment.

The match cooperative shown in environment 1B00 can comprise a set of data providers and consumers, further comprising multiple participants handling NPII (e.g., NPII participant 1 to NPII participant N), and multiple participants handling PII (e.g., PII participant 1 to PII participant M). Strictly as one example, the PII participants can be physical stores or websites capturing identifiable user attributes (e.g., coupon use, store purchases, etc.) and identifiable information (e.g., Jane.Doe@Gmail.com) associated with identifiable users (e.g., Jane Doe), and the NPII participants can be websites capturing user attributes (e.g., gender, interests, etc.) associated with their users (e.g., described by cookie IDs). The user attributes can be any sort or any form of a characteristic of a user. Such user attributes can be stored in electronic records in an association with a particular person (e.g. an electronic record indicating that "Bob Jones" redeemed a coupon. User attributes can also be stored in a cookie. In some settings a user attribute can be associated with a particular person, and in other settings a user attribute can be void of any association with a particular person. Strictly as examples, within the setting of "Bob Jones'" computer, it can be deemed that the attribute "gender=male" is in association with "Bob Jones". However, if the attribute "gender=male" is considered outside of the context of "Bob Jones'" computer, and without a way to associate the attribute "gender=male" to Bob Jones, then that attribute is considered anonymous. In still other situations, the attribute "gender=male" might be associated with a code or hash or symbol that has a one-way association to Bob Jones. For example, if the attribute "gender=male" is associated with an obfuscating code "123456ABC" but there is no mechanism present to associate the obfuscated code "123456ABC" to Bob Jones (or to Bob Jones' computer), then the attribute "gender=male" is considered anonymous. The term anonymous user attribute and the term obfuscated representation are used throughout this disclosure. An obfuscated representation (e.g., obfuscated representation of a user or person) can be achieved by having a one-way association. For example, the association can be from the user to the code, but not from the code to the user. Some implementations obfuscate the person (e.g., by name) or personally-identifiable information (e.g., by email address) using a hashing technique. Other implementations obfuscate the person (e.g., by name) or personally-identifiable information (e.g., by email address) using a coding technique where the data provider has access to an association from the user to the code, however the recipient does not have access to the association from the user to the code, and the recipient does not have an association from the code to the anonymous user.

Both the NPII participants and the PII participants can choose to share data with a data management platform as part of the match cooperative such that each participant can learn more about their respective users. Specifically, as shown, the PII participants would like to discover and consume additional data related to the identifiable users that are known to them (e.g., for targeted online advertising).

The herein disclosed techniques enable the data management platform to exploit the benefit of having all of the data collected from the data providers and consumers into a common ID space—and yet comply with privacy regulations. By receiving user attributes pertaining to an obfuscated representation of an anonymous user from the PII participants, privacy concerns can be mitigated or eliminated. The data management platform can match obfuscated representations of users, can associate anonymous attributes to matching obfuscated representations of users, and can deliver the matched anonymous attributes to the participants. Such matching can be performed in real time. For example, in the environment 1B00 using the herein disclosed techniques, an identifiable user who just logged in (e.g., using an email address) to the website of a PII participant immediately after anonymously shopping online for cell phone accessories, can be served a targeted ad for cell phone accessories upon login completion. For comparison, and as described in FIG. 1C, legacy approaches for discovering additional attributes (e.g., from NPII) pertaining to a particular identifiable user can require offline batch processing and take one week or more.

Various techniques to obfuscate PII can be used singly, or in combination to achieve a specific level of obfuscation. For example, merely cropping or truncating PII such as an email address (e.g., "bobjones@sbcglobal.net" becomes "bobjones") does not provide obfuscation. However, encoding or encrypting an email address (e.g., "bobjones@sbcglobal.net" becomes "123456ABC") does provide obfuscation. One example of encrypting or obfuscating the representation is hashing, and one example of t hashing is use of a cryptographic hash such as MD5 or SHA.

Figure 1C:
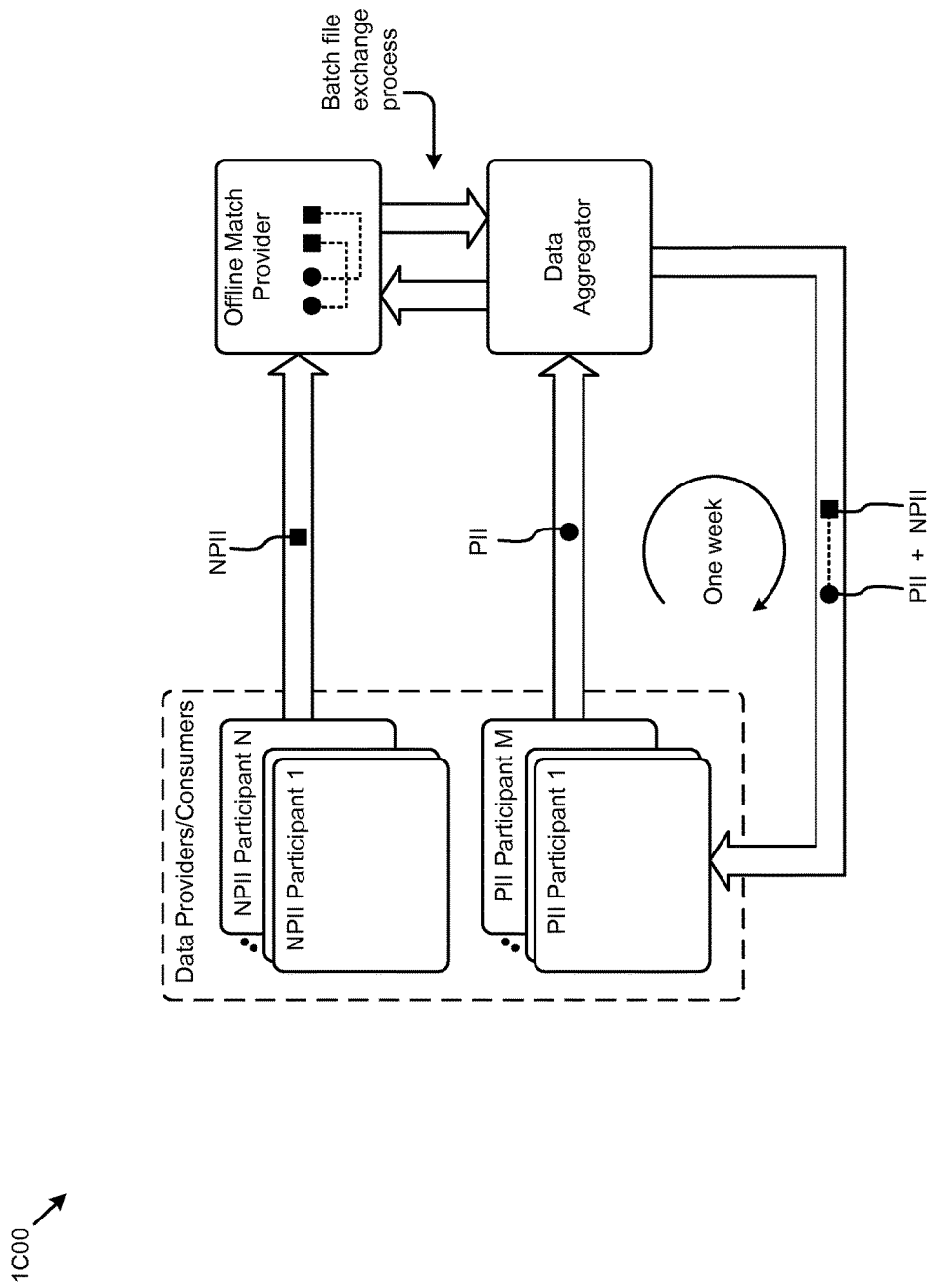
FIG. 1C presents an environment depicting an offline matching approach for comparison to online techniques for matching user attributes without handling personally identifiable information.

FIG. 1C presents an environment 1C00 depicting an offline matching approach for comparison to online techniques for matching user attributes without handling personally identifiable information. As an option, one or more instances of environment 1C00 or any aspect thereof may be implemented in the context of the architecture and functionality of the embodiments described herein. Also, the environment 1C00 or any aspect thereof may be implemented in any desired environment.

Environment 1C00 depicts a legacy approach for discovering additional attributes (e.g., from NPII) pertaining to a particular identifiable user (e.g., PII). Specifically, for comparison, environment 1C00 comprises the same set of data providers and consumers described in FIG. 1B. As shown, an offline match provider can receive NPII from the NPII participants and a data aggregator can receive PII from the PII participants. The data aggregator can invoke a batch file exchange process with the offline match provider to perform a matching of attributes associated with the PII and attributes associated with the NPII. The matched attributes are returned to the data aggregator and forwarded to the PII participants, each PII participant receiving only the PII and the matched NPII attributes related to identifiable persons that are known to them. The approach shown in environment 1C00 involves the handling of PII (e.g., by the data aggregator and offline match provider) and requires compliance with privacy regulations, limiting the scope of the NPII (e.g., only NPII from the PII owner or participant website) that can be associated with the PII. Further, due, in part, to privacy compliance requirements and reliance on offline data, this legacy approach can take several days and even weeks to complete a match.

Figure 1D:
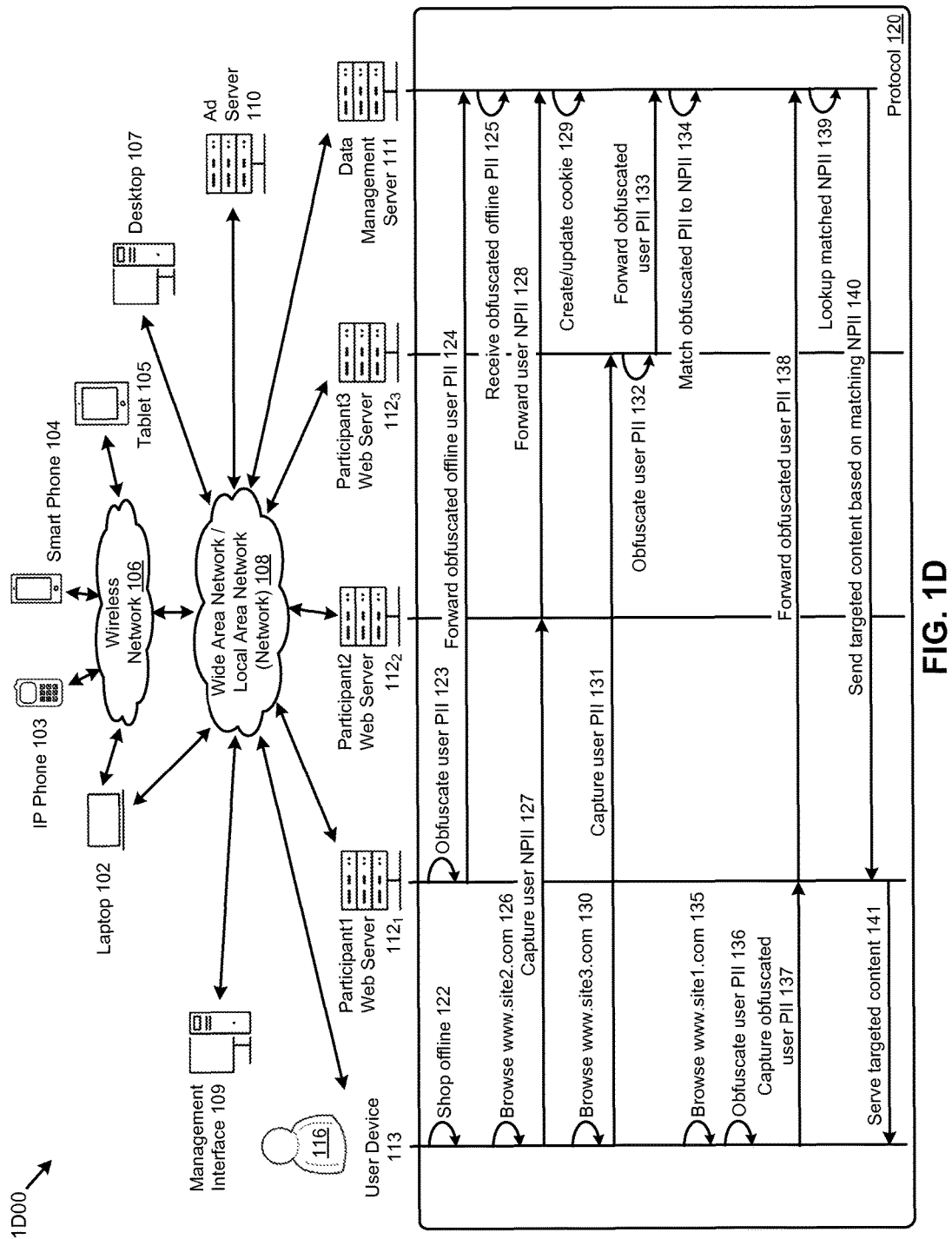
FIG. 1D presents an environment for conducting an Internet advertising campaign based on matching user attributes without handling personally identifiable information, according to an embodiment.

FIG. 1D presents an environment 1D00 for conducting an Internet advertising campaign based on matching user attributes without handling personally identifiable information. As an option, one or more instances of environment 1D00 or any aspect thereof may be implemented in the context of the architecture and functionality of the embodiments described herein. Also, the environment 1D00 or any aspect thereof may be implemented in any desired environment.

As shown in FIG. 1D, environment 1D00 comprises at least one instance of a data management server 111, a plurality of web servers 112 (e.g., Participant1 web server $112_1$, Participant2 web server $112_2$, and Participant3 web server $112_3$), at least one instance of an ad server 110, at least one instance of a management interface 109, and at least one instance of a user device 113. User device 113 can represent one of a variety of other devices (e.g., a desktop computer 107, a laptop computer 102, an IP phone 103, a smart phone 104, a tablet 105, etc.). The aforementioned servers and devices can communicate through a wireless network 106 and a network 108 (e.g., a wide area network (WAN), a local area network (LAN), etc.). The wireless network 106 and network 108 can be collectively referred to as the Internet.

A protocol 120 depicts operations and communications on and among user device 113, the plurality of web servers 112, and the data management server 111. In the example shown in protocol 120, a user 116 also operates user device 113 and performs other activities. Specifically, the user 116 might shop offline (see operation 122) at the physical store of Participant1, and generate PII (e.g., an email address during rewards program registration). Participant1 can then obfuscate the captured user PII and forward the obfuscated representation of the user PII to data management server 111 (see operation 123 and message 124). Data management server 111 will receive the obfuscated offline PII (see operation 125) and store it for future reference. User 116 may later anonymously browse a website "www.site2.com" hosted by Participant2 web server $112_2$ (see operation 126). Participant2 web server $112_2$ may then capture user NPII (e.g., in-market "Auto", IP address of user device 113, etc.) and forward the NPII to data management server 111 (see message 127 and message 128) such that data management server 111 can create or update a cookie for website "www.site2.com" on user device 113 (see operation 129). User 116 may then login to and browse website "www.site3.com" (see operation 130) such that Participant3 web server $112_3$ can capture user PII (see message 131) and generate an obfuscated representation of user PII, then forward it to data management server 111 (see operation 132 and message 133). In some cases, the data management server 111 can then have enough information to discover one or more matches of the attributes associated with the obfuscated PII related to user 116 and the attributes associated with the NPII related to user 116 (see operation 134) based on various data (e.g., common attributes, etc.) and methods (e.g., deterministic matching, probabilistic matching, etc.). Data management server 111 can perform such matches without handling the PII from user 116.

Many possibilities for implementing a matching mechanism are possible. For example, a match can be deemed if the obfuscated codes are identical. Or, as heretofore indicated deterministic matching and/or probabilistic matching, and/or other matching techniques can be used. A matching mechanism can be any forms of logic implemented in software and/or hardware that is configured to receive a plurality of obfuscated codes or other anonymous information and to associate the obfuscated information when a match is determined to be present. A match between two obfuscated codes can be a one-to-one match, or can be a one to many-match, or can be a many-to-one match.

As shown in protocol 120, one or more participants can use the matched attributes for a targeted advertising campaign. Specifically, for example, user 116 can then use user device 113 to login to and browse website "www.site1.com" hosted by Participant1 web server $112_1$ and owned by Participant1, who is also the owner of the physical store at which user 116 earlier shopped offline (see operation 135). Once logged in to "www.site1.com", user device 113 can obfuscate the PII of user 116 such that the obfuscated user PII can be captured by Participant 1 web server $112_1$ and forwarded to data management server 111 for advertising campaign targeting purposes (see operation 136, message 137, and message 138). Data management server 111 will look up any NPII matched to the obfuscated PII forwarded from Participant1 web server 112₁ (see operation 139) and send targeted content based on the matching NPII (e.g., in-market "Auto") back to Participant1 web server 112₁ (see message 140) to serve to user 116 browsing the website "www.site1.com" on user device 113 (see message 141). The herein disclosed techniques implemented in environment 1D00 and protocol 120 enabled Participant1, who initially knew only PII pertaining to user 116, to target the user 116 in an online advertising campaign based on NPII captured from another source, all without sharing private PII with other parties within environment 1D00.

Figure 2A:
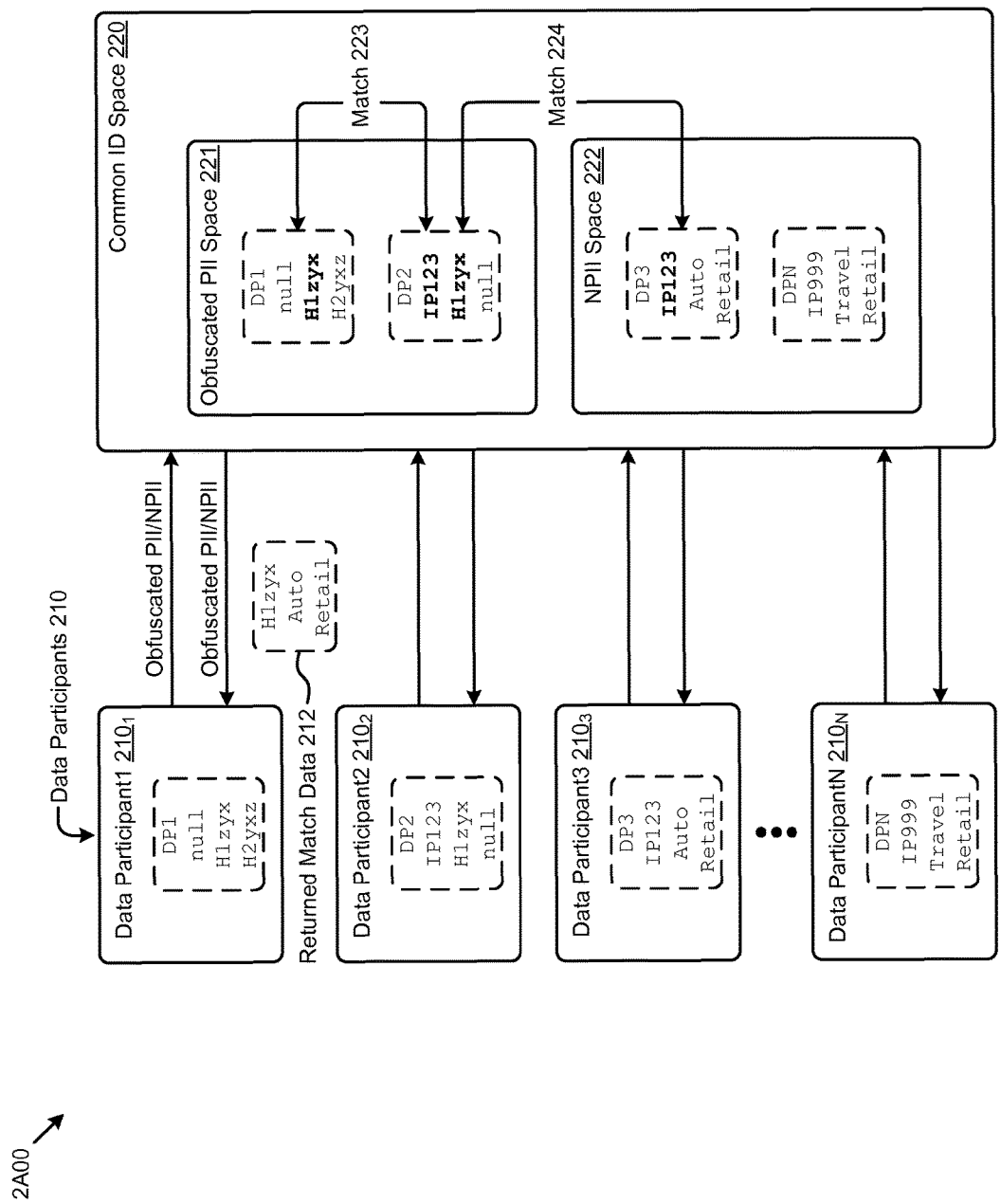
FIG. 2A shows a communication exchange within a cooperative ecosystem supporting multi-channel Internet advertising based on matching user attributes without handling personally identifiable information.

FIG. 2A shows a communication exchange within a cooperative ecosystem 2A00 supporting multi-channel Internet advertising based on matching user attributes without handling personally identifiable information. As an option, one or more instances of cooperative ecosystem 2A00 or any aspect thereof may be implemented in the context of the architecture and functionality of the embodiments described herein. Also, the cooperative ecosystem 2A00 or any aspect thereof may be implemented in any desired environment.

The cooperative ecosystem 2A00 of FIG. 2A comprises a plurality of data participants 210 (e.g., Data Participant1 210₁, Data Participant2 210₂, Data Participant3 210₃, and so on to Data ParticipantN 210$_N$) communicating with a common ID space 220. In some embodiments, the operations and communications of the plurality of data participants 210 and common ID space 220 can be performed at the plurality of web servers 112 and data management server 111, respectively, of environment 1D00. In some embodiments, the plurality of data participants 210 will send and receive obfuscated PII and NPII to and from common ID space 220 using private communication channels. In this configuration, common ID space 220 will not handle any PII, and any PII unique to a given data participant will not be shared with other data participants, either directly or indirectly (e.g., through obfuscated PII and/or NPII matching).

As an example, representative user data records for each data participant are shown in FIG. 2A. Specifically, Data Participant1 210₁ (e.g., source "DP1") and Data Participant2 210₂ (e.g., source "DP2") have captured PII data records associated with an identifiable user, obfuscated the identifiable portions of the PII data records (e.g., at user device 113, Participant1 web server 112₁, Participant2 web server 112₂, etc.), and sent them to an obfuscated PII space 221 of common ID space 220. Also, Data Participant3 210₃ (e.g., source "DP3") and Data ParticipantN 210$_N$ (e.g., source "DPN") have captured NPII data records associated with an anonymous user and sent them to an NPII space 222 of common ID space 220. Matching of obfuscated PII and NPII can then be performed in common ID space 220 (e.g., by data management server 111).

For example, in obfuscated PII space 221, data records from "DP1" and "DP2" have a common attribute in a hashed email "H1zyx" and can be associated with a match 223. Also, the data record from "DP3" in NPII space 222 and the data record from "DP2" in obfuscated PII space 221 share a common attribute in a device IP address "IP123" and can be associated with a match 224. Due to match 223 and due to match 224, the data records from "DP1", "DP2", and "DP3" are all associated, and Data Participant1 210₁ can target the user having hashed email "H1zyx" for advertising campaigns with audiences defined by in-market "Auto" and/or in-market "Retail" (e.g., see returned match data 212). A match can be deemed or determined on the basis of an equivalence (e.g., string or value equivalence) or an equivalence function (e.g., fields of the data record are used in a combination of values so as to deem or determine an equivalence).

Figure 2B:
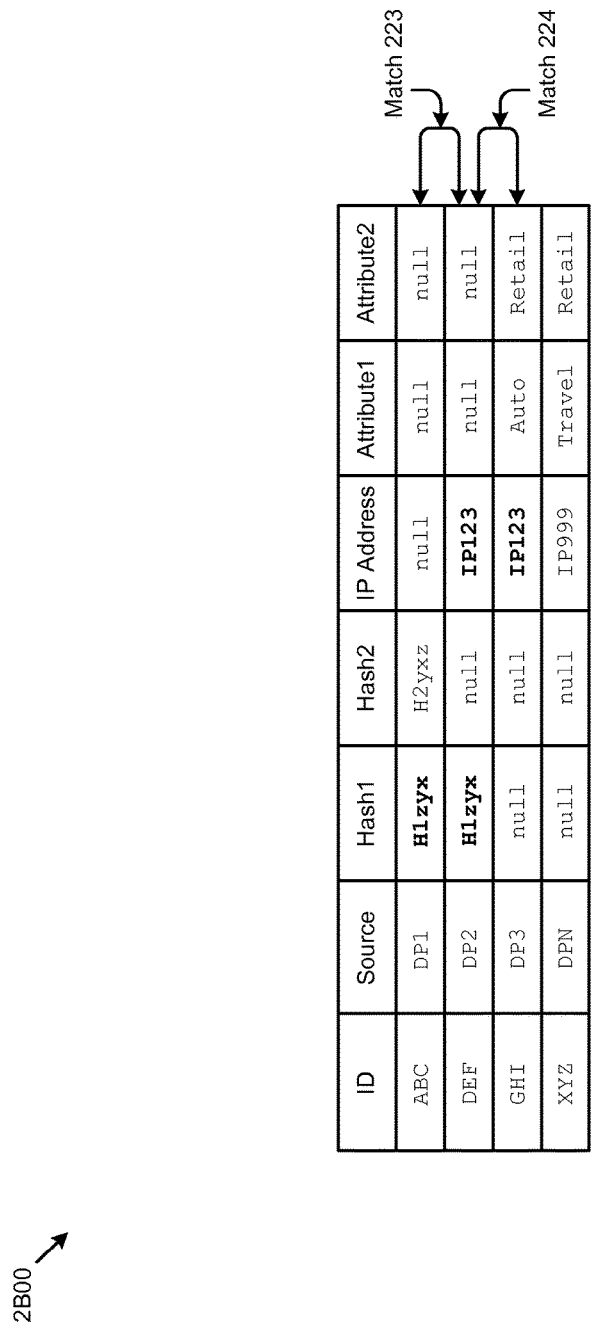
FIG. 2B shows instances of multiple interrelated data structures showing example techniques for matching user attributes without handling personally identifiable information.

FIG. 2B shows instances of multiple interrelated data structures 2B00 showing example techniques for matching user attributes without handling personally identifiable information. As an option, one or more instances of multiple interrelated data structures 2B00 or any aspect thereof may be implemented in the context of the architecture and functionality of the embodiments described herein. Also, the multiple interrelated data structures 2B00 or any aspect thereof may be implemented in any desired environment.

The embodiment shown in FIG. 2B is one example of a data structure that can be used for recording and associating obfuscated PII and NPII for multiple users. Specifically, the diagram of multiple interrelated data structures 2B00 shows each data record (e.g., row) in the data table comprising an "ID" field, a "Source" field, a "Hash1" field, a "Hash2" field, an "IP Address" field, an "Attribute1" field, and an "Attribute2" field. The fields are representative of a possible data structure and the number and name of the fields can vary. The "ID" field can represent a unique key or identifier of the data record. The "Source" field can represent the source of the data record (e.g., the plurality of data participants 210 in cooperative ecosystem 2A00). The "Hash1" and "Hash2" fields can represent obfuscated PII (e.g., normalized and hashed email and/or phone number). In some embodiments, two or more obfuscated PII fields can be required to represent multiple types of PII (e.g., email address and phone number), or to represent multiple types of obfuscation the latter required to accommodate variability in obfuscation implementation (e.g., throughout the cooperative ecosystem 2A00, match cooperative of environment 1B00, etc.). The "IP Address" field can represent the user device associated with the data record.

Further details regarding general approaches to user device IDs including mobile advertisement IDs are described in U.S. Application Ser. No. 62/040,197, titled "A MULTI-TIER REGIME FOR CREATING AND MANAGING ONLINE USER PROFILES" filed on Aug. 21, 2014, which is hereby incorporated by reference in its entirety.

In some embodiments, other fields and information such as mobile advertisement IDs (e.g., MAIDs) can be used for identifying the user device associated with the data record. The "Attribute1" and "Attribute2" can represent user profile data (e.g., shopping behavior) associated with the data record. In some embodiments, user profile data can be extensive, and would require significantly more attribute columns than the two columns shown in the example of FIG. 2B. In some situations, user profile data can be directly associated with obfuscated PII in the same data record. In other situations, a set of user profile data can be amalgamated from NPII data stored at locations accessible via pointers. Given the multiple interrelated data structures 2B00, matching of data records can be performed. Specifically, data records with respective IDs of "ABC" and "DEF" have a common "Hash1" field "H1zyx" and can be associated with match 223. Also, data records with respective IDs of "DEF" and "GHI" have a common "IP address" field "IP123" and can be associated with match 224. Due to match 223 and match 224, the user represented by data record with the ID of "ABC", originally showing no "Attribute 1" and "Attribute2", can further be associated with the "Attribute1" and "Attribute2" of in-market "Auto" and in-market "Retail", respectively.

Figure 3A:
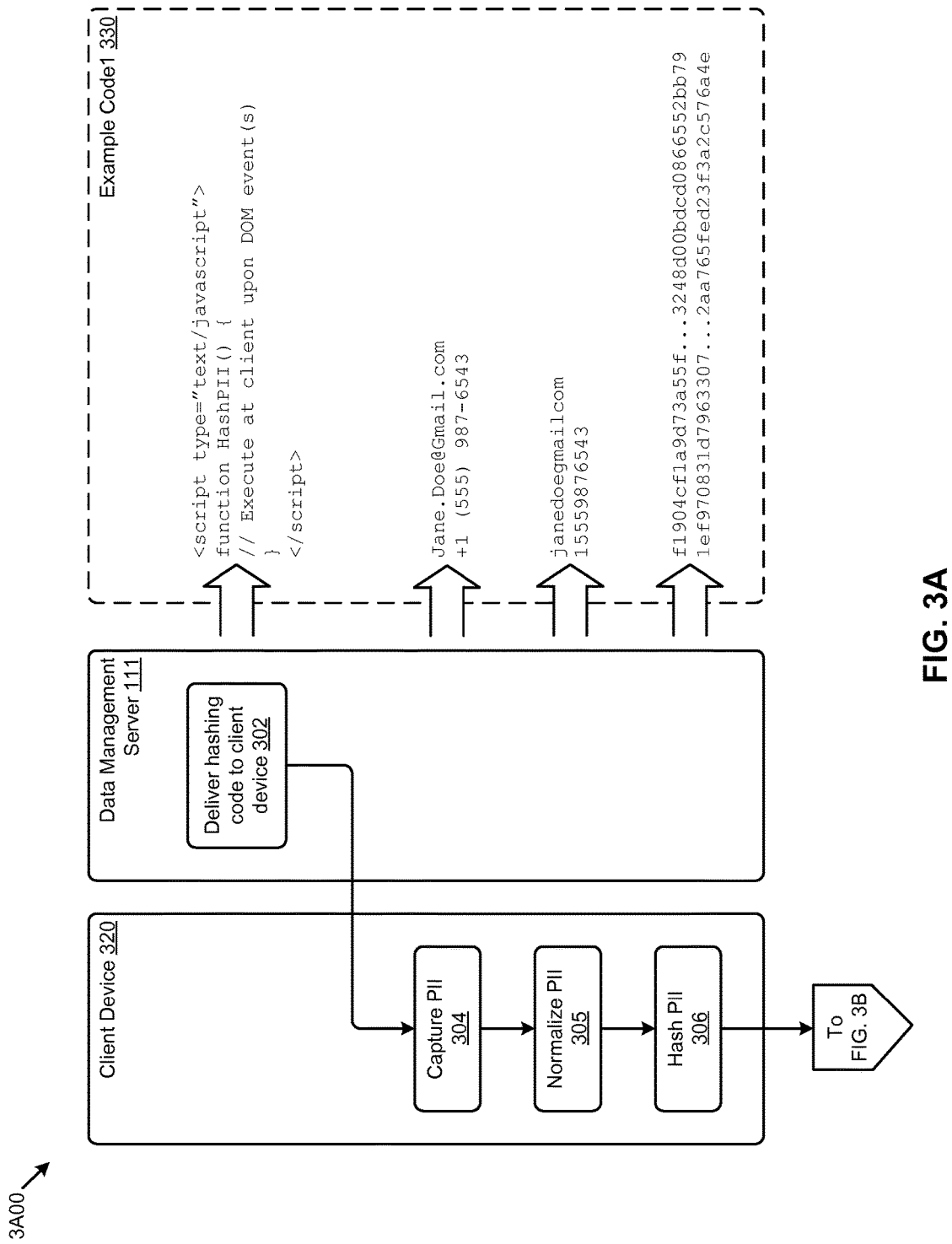
FIG. 3A depicts a technique for obfuscating personally identifiable information in systems for matching user attributes without handling personally identifiable information, according to an embodiment.

FIG. 3A depicts a technique 3A00 for obfuscating personally identifiable information in systems for matching user attributes without handling personally identifiable information. As an option, one or more instances of technique 3A00 or any aspect thereof may be implemented in the context of the architecture and functionality of the embodiments described herein. Also, the technique 3A00 or any aspect thereof may be implemented in any desired environment.

The technique 3A00 shown in FIG. 3A depicts a flow of sample operations and related example programming instructions or example code #1 330 executed by various computing systems (e.g., servers and devices in environment 1D00) for obfuscating PII. Specifically, in FIG. 3A, some operations are performed on a client device 320 (e.g., user device 113, Participant1 web server 112$_1$, etc.) and some operations are performed on data management server 111. In some embodiments, a different set of operations and sequence can be required. In other embodiments, operations can be executed on computing systems different than those depicted in technique 3A00.

Specifically, technique 3A00 starts by delivering hashing code to the client device 320 (see step 302). For example, as depicted in example code #1 330, the hashing code can be a Javascript function included in a web page being browsed by the user and conditionally executed based on certain user activities (e.g., document object model (DOM)) events, user login, user registration, etc.). Technique 3A00 can then capture PII (see step 304) during user activity (e.g., user registration) and normalize and hash the PII using the hashing code (see step 305 and step 306). For example, as depicted in example code #1 330, an email address and phone number (e.g., Jane.Doe@Gmail.com, +1 (555) 987-6543) is captured, normalized (e.g., janedoegmailcom, 15559876543), and hashed (e.g., f190 . . . bb79, 1ef9 . . . 6a4e). Other normalizing techniques can be used instead of, or in addition to the foregoing example.

The technique shown in 3A00 shown in FIG. 3A enables a data management provider (e.g., a data provider operating a data management server) to deploy common hashing code and/or algorithms to all participants in a match cooperative such that a uniformity in the hashing technique can be obtained across the cooperative. While the obfuscation code or hashing code or hashing algorithm (e.g., MD5, SHA256, etc.) can be common, each participant can have a unique hashing seed to maintain the security of the PII. In some cases a participant can use a combination of a unique hashing algorithm and a hashing seed, and such a combination can be represented as an obfuscation version identifier. Multiple combinations or versions can be implemented by any one or more participants, and the combinations in use can be represented and communicated using a plurality of obfuscation version identifiers. One or more obfuscation version identifiers can be encoded into a data record together with a respective one or more associations with a particular masked user ID.

Figure 3B:
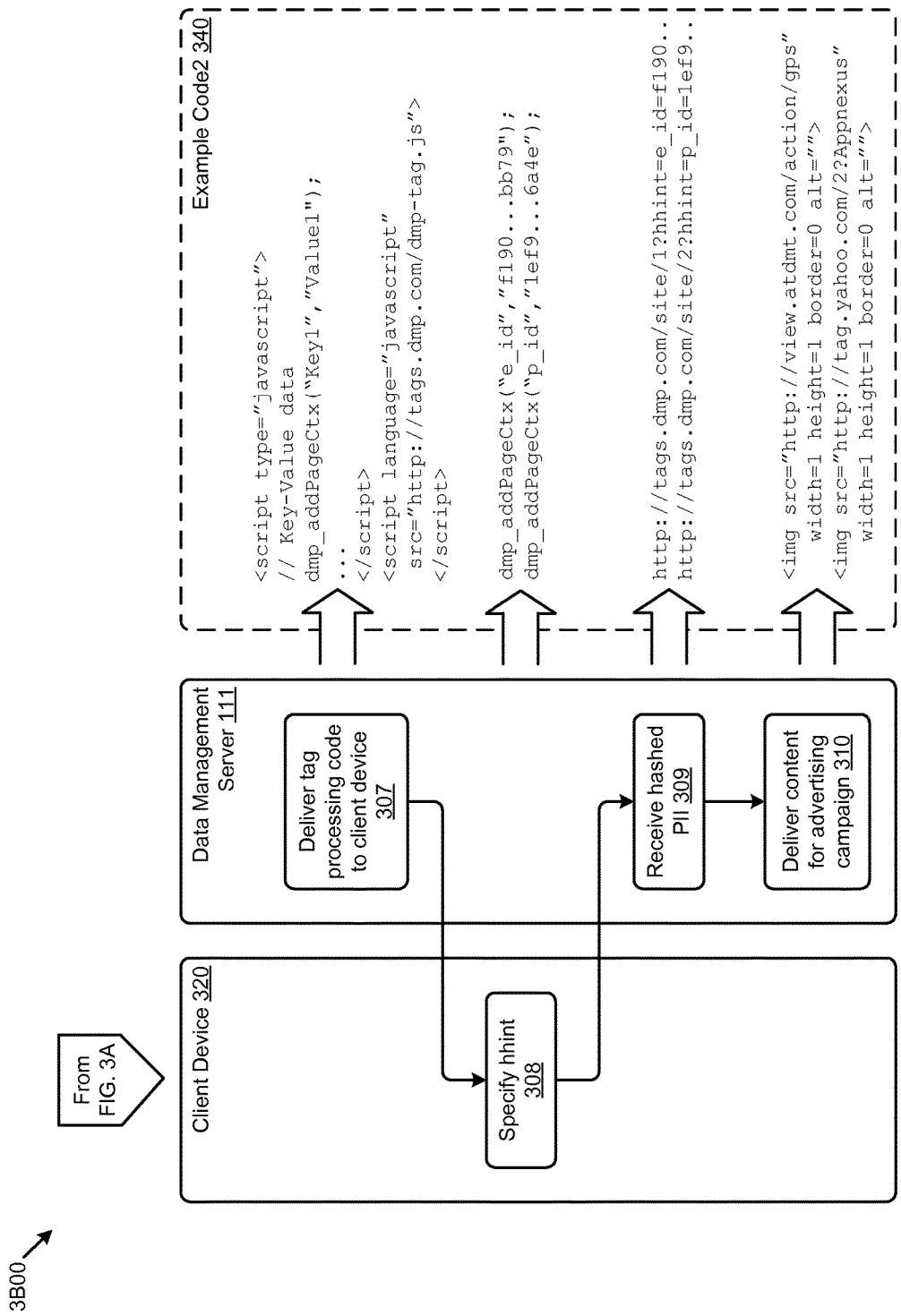
FIG. 3B presents a data flow for processing obfuscated personally identifiable information in systems for matching user attributes without handling personally identifiable information, according to an embodiment.

Steps illustrating a technique for further communicating and processing the obfuscated PII (e.g., across a match cooperative) are described in FIG. 3B.

FIG. 3B presents a data flow 3B00 for processing obfuscated personally identifiable information in systems for matching user attributes without handling personally identifiable information. As an option, one or more instances of data flow 3B00 or any aspect thereof may be implemented in the context of the architecture and functionality of the embodiments described herein. Also, the data flow 3B00 or any aspect thereof may be implemented in any desired environment.

The data flow 3B00 describes a technique for communicating and processing obfuscated PII (e.g., as generated in step 306 of FIG. 3A). Specifically, the data management server 111 can deliver tag processing code to the client device 320 (see step 307). For example, as depicted in example code #2 340, the tag processing code can comprise one or more scripts (e.g., Javascript) having a parameter (e.g., dmp_addPageCtx) that allows certain key-value pairs to be specified at the client device 320. The key-value pairs can include page level and/or user attribute hints (e.g., page hints or phints), and can also include hashed user attribute hints (e.g., hhints). More specifically, two hhints can be specified (see step 308) based on the hashed email and phone number from FIG. 3A as shown (e.g., dmp_addPageCtx ("e_id", "f190 . . . bb79"), dmp_addPageCtx ("p_id", "1ef9 . . . 6a4e"). The tag processing code can further comprise logic (e.g., script dmp-tag.js) to generate requests (e.g., HTTP requests, HTTP calls, tags, etc.) comprising the key-value pairs to be received by the data management server 111 (see step 309). The obfuscated or hashed PII received in the requests can be further processed on a data management platform (e.g., operating on data management server 111) for matching and other operations. For example, the HTML calls or tags (e.g., see example code #2 340 associated with step 309) including the hashed PII (e.g., "?hhint=e_id=f190 . . . bb79") can be fired from the client device 320 back to data management server 111. In response to receiving the hashed PII and other execution of other operations (e.g., matching of hashed PII to NPII), content for one or more targeted advertising campaigns can be delivered (see step 310). For example, data management server 111 (e.g., or ad server 110 in environment 1D00) may send the two advertising beacons shown in example code #2 340 based on user attributes matched to the received hashed PII for that user.

Figure 4:
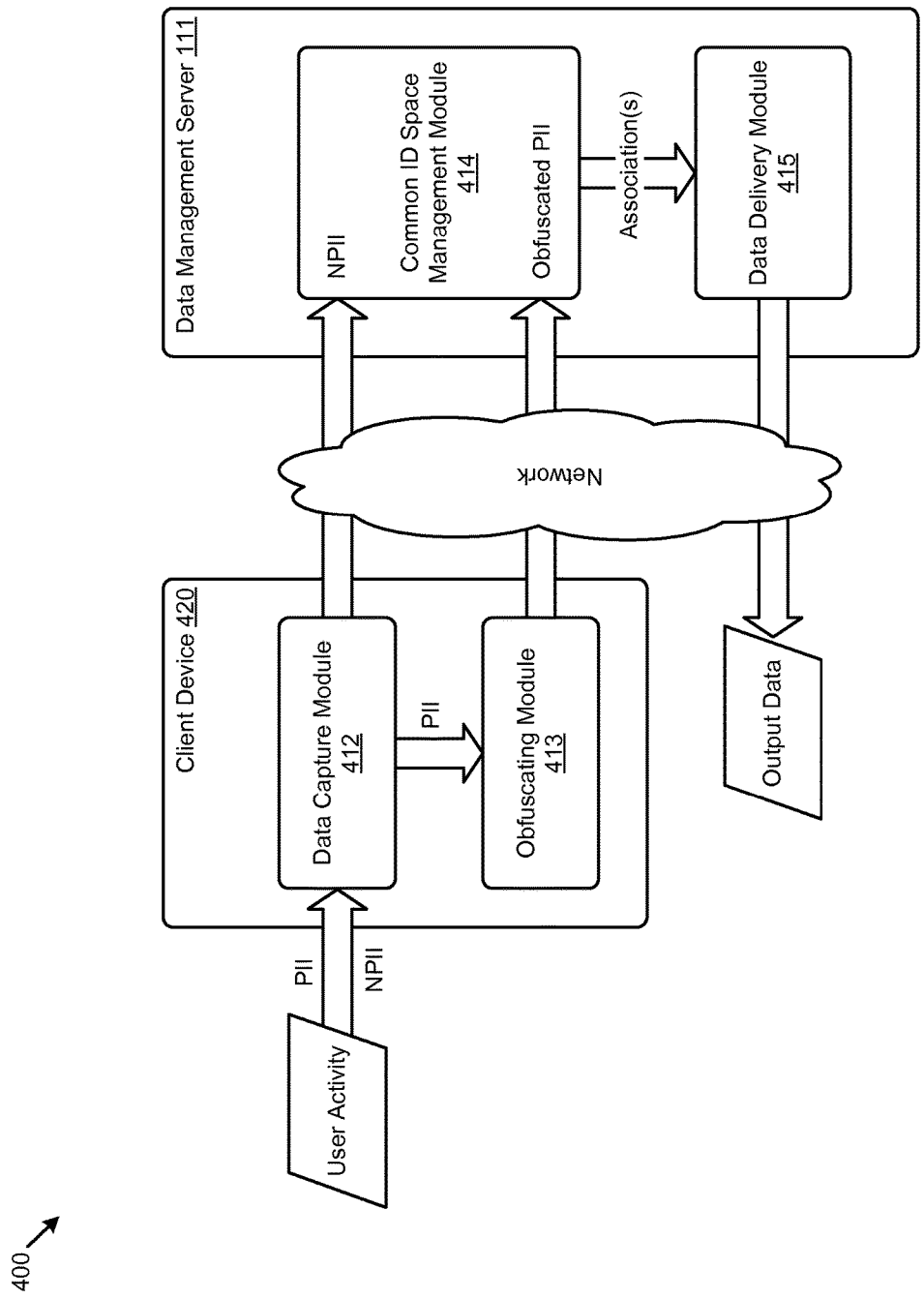
FIG. 4 shows a block diagram of a system for matching user attributes without handling personally identifiable information, according to one embodiment.

FIG. 4 shows a block diagram of a system 400 for matching user attributes without handling personally identifiable information. As an option, one or more instances of system 400 or any aspect thereof may be implemented in the context of the architecture and functionality of the embodiments described herein. Also, the system 400 or any aspect thereof may be implemented in any desired environment.

The shown system 400 in FIG. 4 depicts one embodiment of representative modules of and flows through a client device 420 (e.g., user device 113) and data management server 111 from environment 1D00. Specifically, user device 113 comprises a data capture module 412 and an obfuscating module 413. Further, data management server 111 comprises a common ID space management module 414 and a data delivery module 415. System 400 shows user activity (e.g., browsing, searching, logging in, registration, etc.) generating PII and/or NPII and captured by data capture module 412. Data capture module 412 forwards the NPII to common ID space management module 414 and forwards the PII to obfuscating module 413. Obfuscating module 413 obfuscates the PII before sending the obfuscated PII to common ID space management module 414. Common ID space management module 414 can then associate (e.g., match, map, etc.) the obfuscated PII with the NPII and forward the associations to data delivery module 415. Data delivery module 415 can forward the associations to various participants and systems (e.g., in environment 1D00) for various purposes (e.g., targeted online advertising campaigns).

More specifically, in one or more embodiments, the common ID space management module 414 is configured to receive electronically over a network at least one obfuscated representation of a respective at least one personally identifiable information data record (e.g., obfuscated PII), wherein the personally identifiable information data record comprises a masked user ID portion and at least one identifiable user attribute associated with an identifiable user, and the identifiable portion is obfuscated in the obfuscated representation. The common ID space management module 414 is further configured to receive electronically over a network at least one non-personally identifiable information data record (e.g., NPII), wherein the non-personally identifiable information data record comprises at least one anonymous user attribute associated with an anonymous user. The common ID space management module 414 is further configured to invoke logic to determine an association between at least one obfuscated representation and at least one of a different one of the obfuscated representations and one or more non-personally identifiable information data records.

Additional Embodiments Of The Disclosure

Additional Practical Application Examples

Figure 5A:
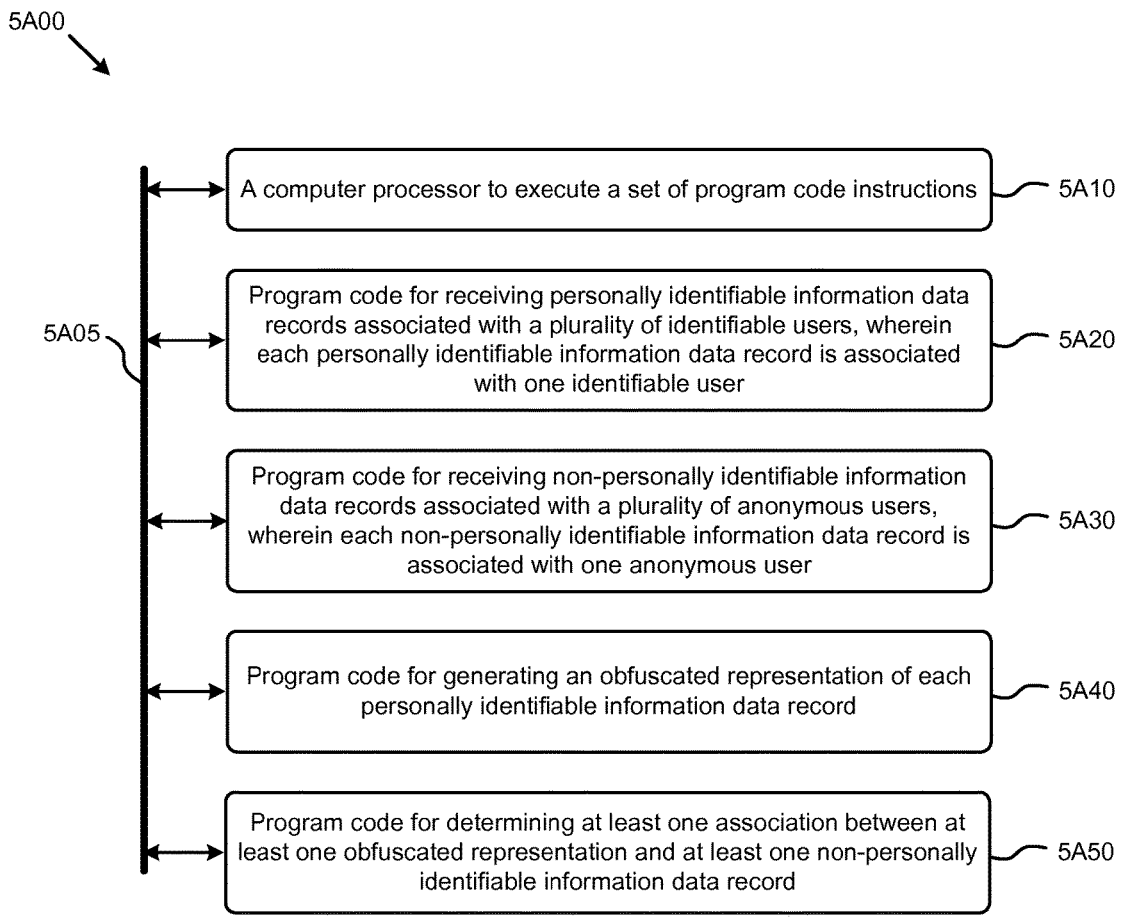
FIG. 5A, FIG. 5B, and FIG. 5C each depict a system as an arrangement of computing modules that are interconnected so as to operate cooperatively to implement any of the herein-disclosed embodiments.

FIG. 5A depicts a system 5A00 as an arrangement of computing modules that are interconnected so as to operate cooperatively to implement any of the herein-disclosed embodiments. The partitioning of system 5A00 is merely illustrative and other partitions are possible. System 5A00 comprises at least one processor and at least one memory, the memory serving to store program instructions corresponding to the operations of the system. As shown, an operation can be implemented in whole or in part using program instructions accessible by a module. The modules are connected to a communication path 5A05, and any operation can communicate with other operations over communication path 5A05. The modules of the system can, individually or in combination, perform method operations within system 5A00. Any operations performed within system 5A00 may be performed in any order unless as may be specified in the claims.

The embodiment of FIG. 5A implements a portion of a computer system, shown as system 5A00, comprising a computer processor to execute a set of program code instructions (see module 5A10) and modules for accessing memory to hold program code instructions to perform: receiving personally identifiable information data records associated with a plurality of identifiable users, wherein each personally identifiable information data record is associated with one identifiable user (see module 5A20); receiving non-personally identifiable information data records associated with a plurality of anonymous users, wherein each non-personally identifiable information data record is associated with one anonymous user (see module 5A30); generating an obfuscated representation of each personally identifiable information data record (see module 5A40); and determining at least one association between at least one obfuscated representation and at least one non-personally identifiable information data record (see module 5A50).

Figure 5B:
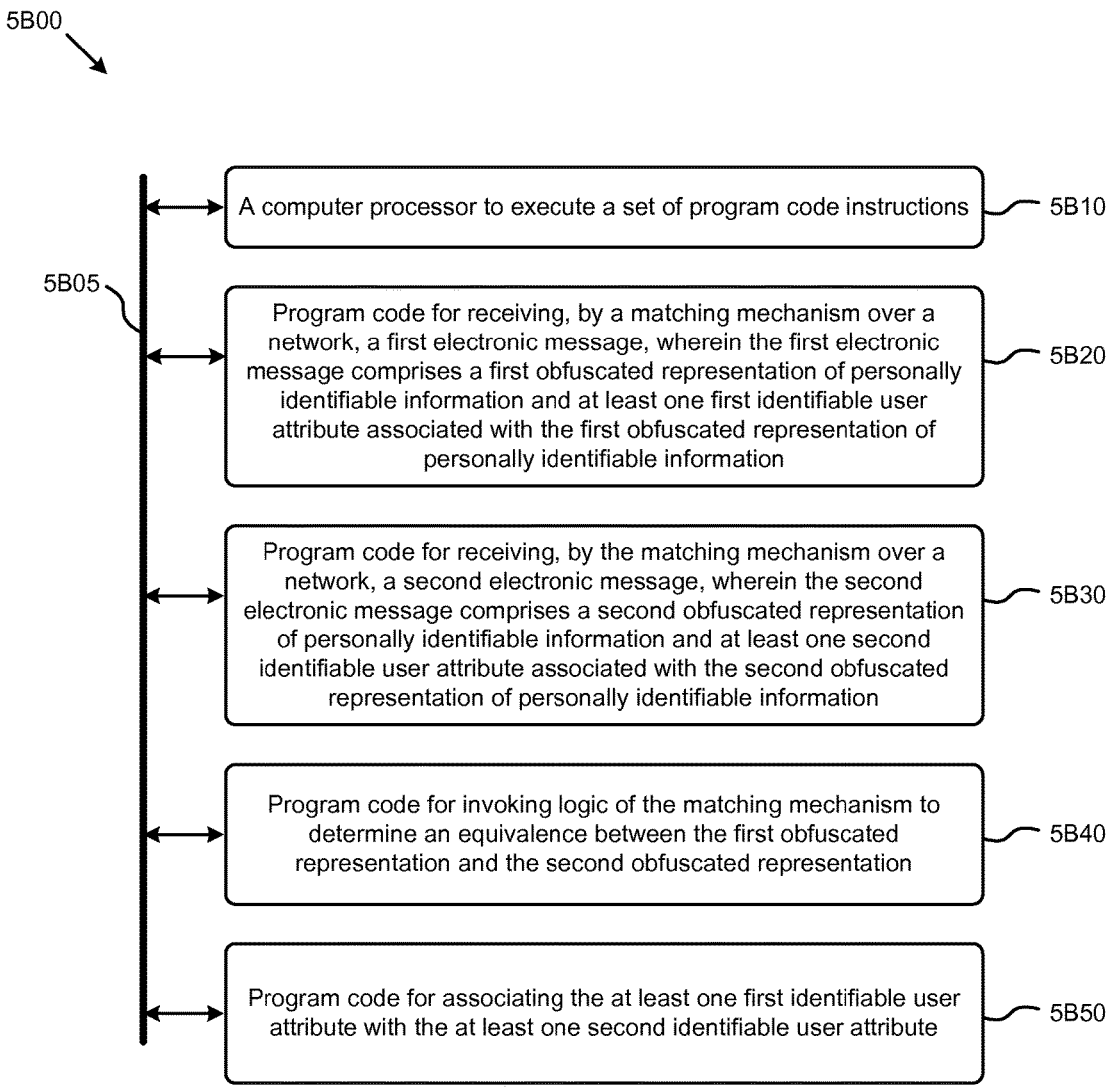

FIG. 5B depicts a system 5B00 as an arrangement of computing modules that are interconnected so as to operate cooperatively to implement any of the herein-disclosed embodiments. The partitioning of system 5B00 is merely illustrative and other partitions are possible. System 5B00 comprises at least one processor and at least one memory, the memory serving to store program instructions corresponding to the operations of the system. As shown, an operation can be implemented in whole or in part using program instructions accessible by a module. The modules are connected to a communication path 5B05, and any operation can communicate with other operations over communication path 5B05. The modules of the system can, individually or in combination, perform method operations within system 5B00. Any operations performed within system 5B00 may be performed in any order unless as may be specified in the claims.

The shown embodiment implements a portion of a computer system, shown as system 5B00, comprising a computer processor to execute a set of program code instructions (see module 5B10) and modules for accessing memory to hold program code instructions to perform: receiving, by a matching mechanism over a network, a first electronic message, wherein the first electronic message comprises a first obfuscated representation of personally identifiable information and at least one first identifiable user attribute associated with the first obfuscated representation of personally identifiable information (see module 5B20); receiving, by the matching mechanism over a network, a second electronic message, wherein the second electronic message comprises a second obfuscated representation of personally identifiable information and at least one second identifiable user attribute associated with the second obfuscated representation of personally identifiable information (see module 5B30); invoking logic of the matching mechanism to determine an equivalence between the first obfuscated representation and the second obfuscated representation (see module 5B40); and associating the at least one first identifiable user attribute with the at least one second identifiable user attribute (see module 5B50).

Figure 5C:
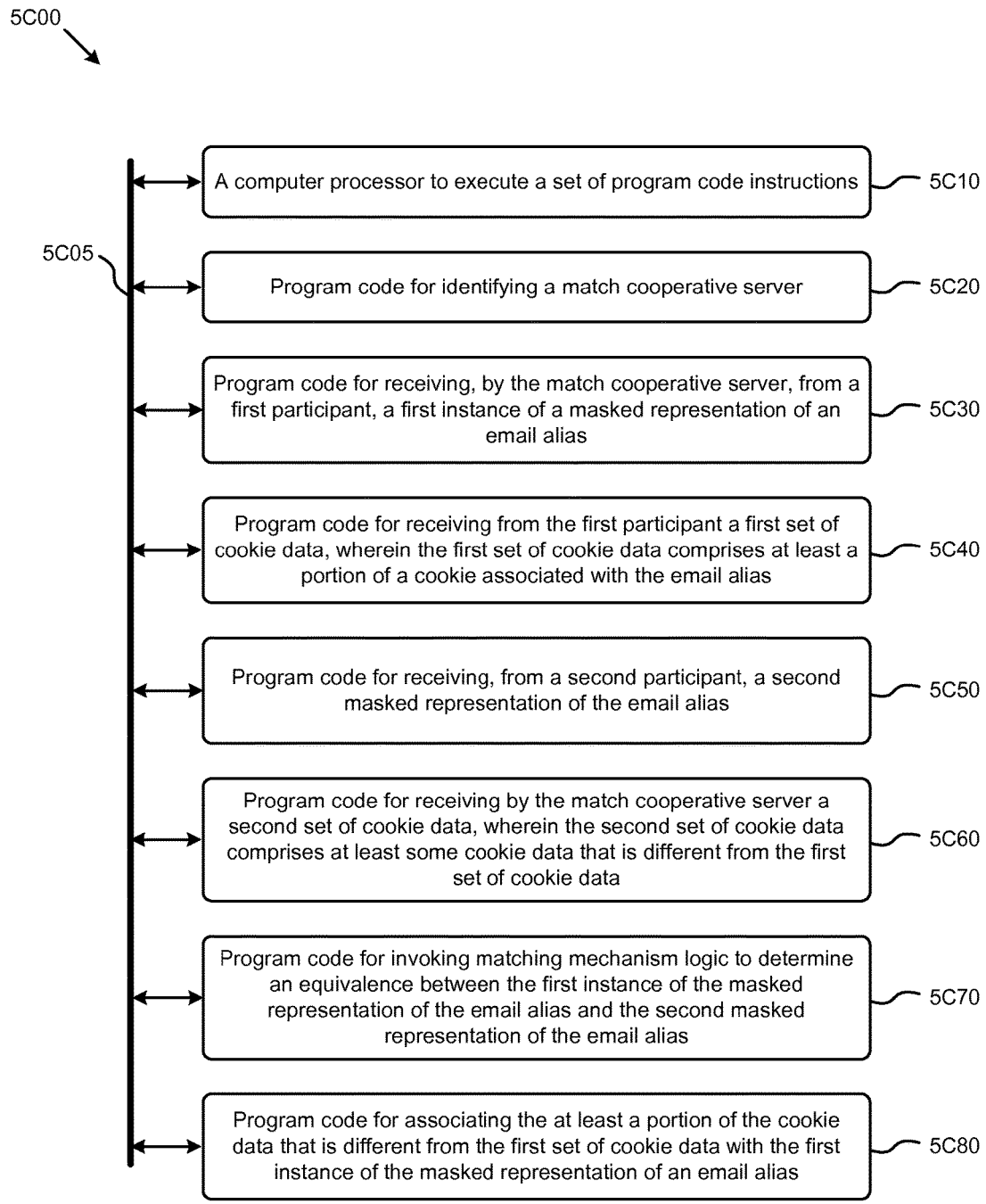

FIG. 5C depicts a block diagram of a system to perform certain functions of a computer system. As an option, the present system 5C00 may be implemented in the context of the architecture and functionality of the embodiments described herein. Of course, however, the system 5C00 or any operation therein may be carried out in any desired environment. The system 5C00 comprises at least one processor and at least one memory, the memory serving to store program instructions corresponding to the operations of the system. As shown, an operation can be implemented in whole or in part using program instructions accessible by a module. The modules are connected to a communication path 5C05, and any operation can communicate with other operations over communication path 5C05. The modules of the system can, individually or in combination, perform method operations within system 5C00. Any operations performed within system 5C00 may be performed in any order unless as may be specified in the claims.

The shown embodiment implements a portion of a computer system, shown as system 5C00, comprising a computer processor to execute a set of program code instructions (see module 5C10) and modules for accessing memory to hold program code instructions to perform: identifying a match cooperative server (see module 5C20); receiving, by the match cooperative server, from a first participant, a first instance of a masked representation of an email alias (see module 5C30); receiving from the first participant a first set of cookie data, wherein the first set of cookie data comprises at least a portion of a cookie associated with the email alias (see module 5C40); receiving, from a second participant, a second masked representation of the email alias (see module 5C50); receiving by the match cooperative server a second set of cookie data, wherein the second set of cookie data comprises at least some cookie data that is different from the first set of cookie data (see module 5C60); invoking matching mechanism logic to determine an equivalence between the first instance of the masked representation of the email alias and the second masked representation of the email alias (see module 5C70); and associating the at least a portion of the cookie data that is different from the first set of cookie data with the first instance of the masked representation of an email alias (see module 5C80).

System Architecture Overview
Additional System Architecture Examples

Figure 6A:
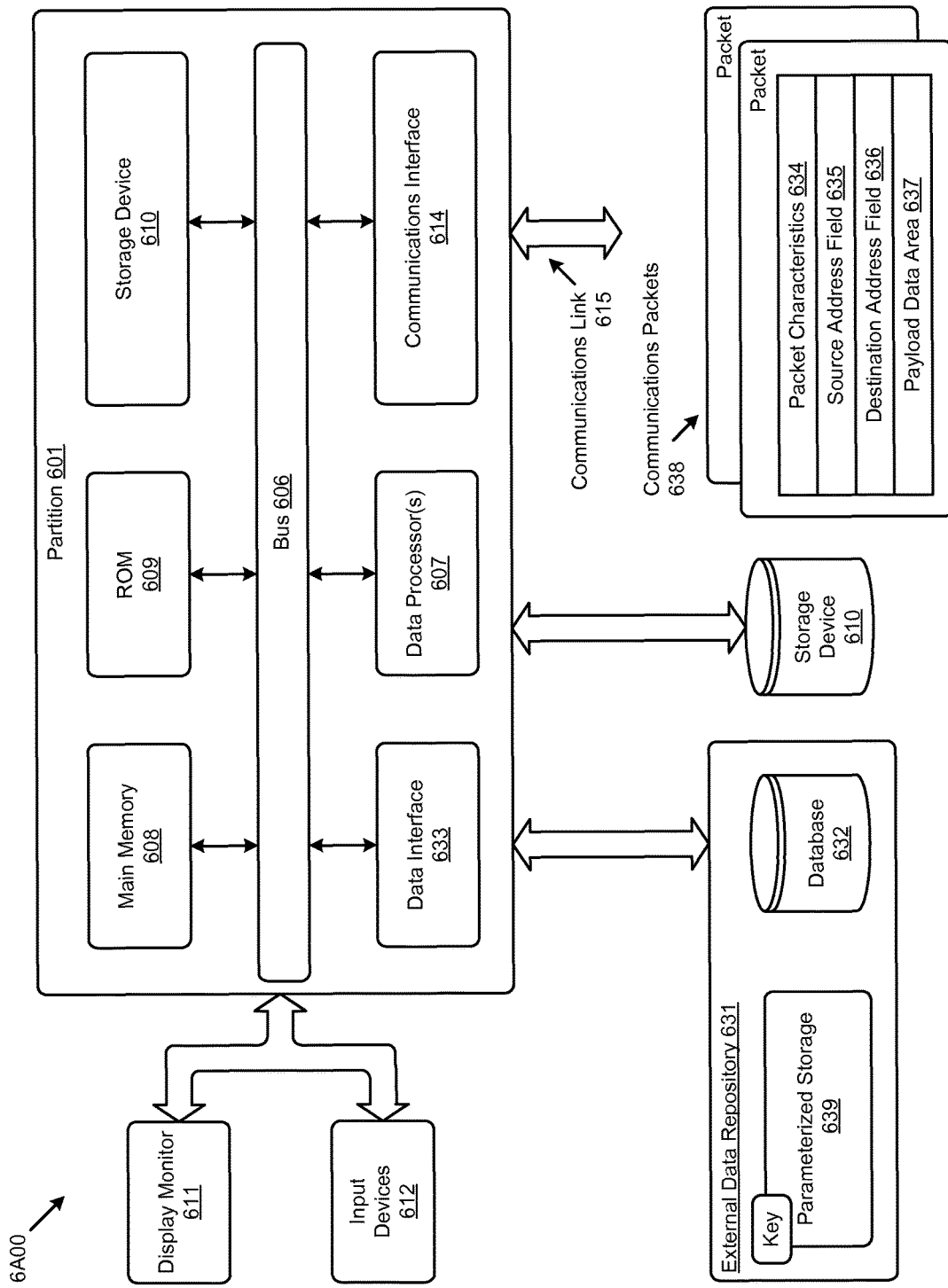
FIG. 6A, FIG. 6B, and FIG. 6C depict exemplary architectures of components suitable for implementing embodiments of the present disclosure, and/or for use in the herein-described environments.

FIG. 6A depicts a block diagram of an instance of a computer system 6A00 suitable for implementing embodiments of the present disclosure. Computer system 6A00 includes a bus 606 or other communication mechanism for communicating information, which interconnects subsystems and devices such as a processor 607, a system memory (e.g., main memory 608, or an area of random access memory RAM), a static storage device (e.g., ROM 609), an internal or external storage device 610 (e.g., magnetic or optical), a data interface 633, a communication interface 614 (e.g., PHY, MAC, Ethernet interface, modem, etc.), a display 611 (e.g., CRT or LCD), input devices 612 (e.g., keyboard, cursor control), and an external data repository 631.

According to an embodiment of the disclosure, computer system 6A00 is at least partially embodied in partition 601, and the computer system 6A00 performs specific operations by processor 607 executing one or more sequences of one or more instructions contained in system memory. Such instructions may be read into system memory from another computer readable/usable medium such as a static storage device or a disk drive. The sequences can be organized to be accessed by one or more processing entities configured to execute a single process or configured to execute multiple concurrent processes to perform work. A processing entity can be hardware-based (e.g., involving one or more cores) or software-based or can be formed using a combination of hardware and software that implements logic, and/or can carry out computations and/or processing steps using one or more processes and/or one or more tasks and/or one or more threads or any combination therefrom.

According to an embodiment of the disclosure, computer system 6A00 performs specific networking operations using one or more instances of communication interface 614. Instances of the communication interface 614 may comprise one or more networking ports that are configurable (e.g., pertaining to speed, protocol, physical layer characteristics, media access characteristics, etc.) and any particular instance of the communication interface 614 or port thereto can be configured differently from any other particular instance. Portions of a communication protocol can be carried out in whole or in part by any instance of the communication interface 614, and data (e.g., packets, data structures, bit fields, etc.) can be positioned in storage locations within communication interface 614, or within system memory, and such data can be accessed (e.g., using random access addressing, or using direct memory access DMA, etc.) by devices such as processor 607.

The communications link 615 can be configured to transmit (e.g., send, receive, signal, etc.) communications packets 638 comprising any organization of data items. The data items can comprise a payload data area 637, a destination address 636 (e.g., a destination IP address), a source address 635 (e.g., a source IP address), and can include various encodings or formatting of bit fields to populate the shown packet characteristics 634. In some cases the packet characteristics include a version identifier, a packet or payload length, a traffic class, a flow label, etc. In some cases the payload data area 637 comprises a data structure that is encoded and/or formatted to fit into byte or word boundaries of the packet.

In some embodiments, hard-wired circuitry may be used in place of or in combination with software instructions to implement aspects of the disclosure. Thus, embodiments of the disclosure are not limited to any specific combination of hardware circuitry and/or software. In embodiments, the term "logic" shall mean any combination of software or hardware that is used to implement all or part of the disclosure.

The term "computer readable medium" or "computer usable medium" as used herein refers to any medium that participates in providing instructions to processor 607 for execution. Such a medium may take many forms including, but not limited to, non-volatile media and volatile media. Non-volatile media includes, for example, optical or magnetic disks such as disk drives or tape drives. Volatile media includes dynamic memory such as a random access memory.

Common forms of computer readable media includes, for example, floppy disk, flexible disk, hard disk, magnetic tape, or any other magnetic medium; CD-ROM or any other optical medium; punch cards, paper tape, or any other physical medium with patterns of holes; RAM, PROM, EPROM, FLASH-EPROM, or any other memory chip or cartridge, or any other non-transitory medium from which a computer can read data. Such data can be stored, for example, in any form of external data repository 631, which in turn can be formatted into any one or more storage areas, and which can comprise parameterized storage 639 accessible by a key (e.g., filename, table name, block address, offset address, etc.).

In an embodiment of the disclosure, execution of the sequences of instructions to practice the disclosure is performed by a single instance of the computer system 6A00. According to certain embodiments of the disclosure, two or more instances of computer system 6A00 coupled by a communications link 615 (e.g., LAN, PTSN, or wireless network) may perform the sequence of instructions required to practice embodiments of the disclosure using two or more instances of components of computer system 6A00.

The computer system 6A00 may transmit and receive messages, data, and instructions including programs (e.g., application code), through communications link 615 and communication interface 614. Received program code may be executed by processor 607 as it is received and/or stored in the shown storage device or in or upon any other non-volatile storage for later execution. Computer system 6A00 may communicate through a data interface 633 to a database 632 on an external data repository 631. Data items in a database can be accessed using a primary key (e.g., a relational database primary key).

The partition 601 is merely one sample partition. Other partitions can include multiple data processors, and/or multiple communications interfaces, and/or multiple storage devices, etc. within a partition. For example, a partition can bound a multi-core processor (e.g., possibly including embedded or co-located memory), or a partition can bound a computing cluster having plurality of computing elements, any of which computing elements are connected directly or indirectly to a communications link. A first partition can be configured to communicate to a second partition. A particular first partition and particular second partition can be congruent (e.g., in a processing element array) or can be different (e.g., comprising disjoint sets of components).

A module as used herein can be implemented using any mix of any portions of the system memory and any extent of hard-wired circuitry including hard-wired circuitry embodied as a processor 607. Some embodiments include one or more special-purpose hardware components (e.g., power control, logic, sensors, transducers, etc.). A module may include one or more state machines and/or combinational logic used to implement or facilitate the performance characteristics of building and operating a match cooperative without handling personally identifiable information.

Various implementations of the database 632 comprise storage media organized to hold a series of records or files such that individual records or files are accessed using a name or key (e.g., a primary key or a combination of keys and/or query clauses). Such files or records can be organized into one or more data structures (e.g., data structures used to implement or facilitate aspects of building and operating a match cooperative without handling personally identifiable information). Such files or records can be brought into and/or stored in volatile or non-volatile memory.

Figure 6B:
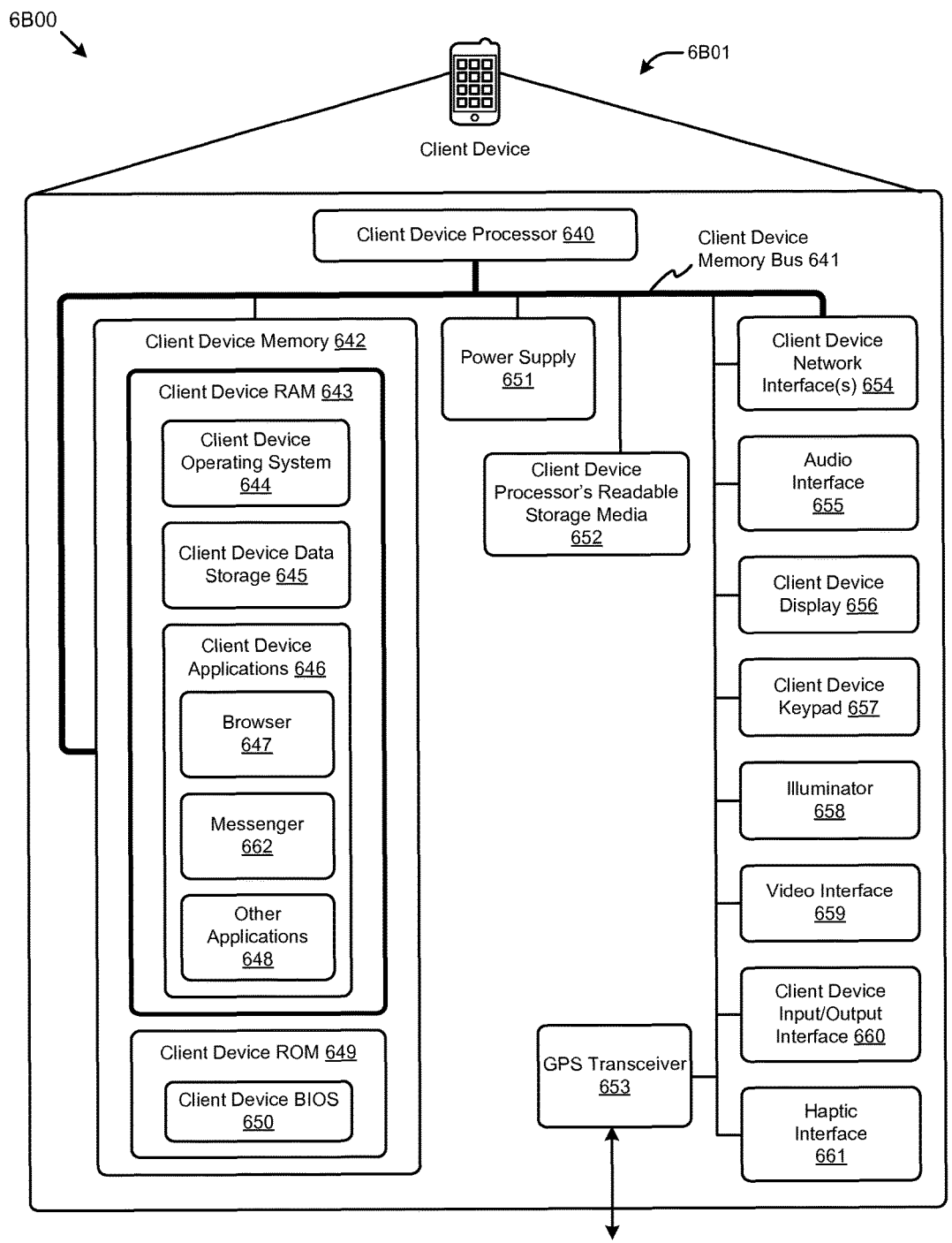

FIG. 6B depicts a block diagram 6B00 of an instance of a client device 6B01 that may be included in a system implementing instances of the herein-disclosed embodiments. Client device 6B01 may include many more or fewer components than those shown in FIG. 6B. Client device 6B01 may represent, for example, an embodiment of at least one of client devices as heretofore disclosed.

As shown in the figure, client device 6B01 includes a client device processor 640 in communication with a client device memory 642 via a client device memory bus 641. Client device 6B01 also includes a power supply 651, one or more client device network interfaces 654, an audio interface 655, a client device display 656, a client device keypad 657, an illuminator 658, a video interface 659, a client device IO interface 660, a haptic interface 661, and a GPS transceiver 653 for global positioning services.

The power supply 651 provides power to client device 6B01. A rechargeable or non-rechargeable battery may be used to provide power. The power may also be provided by an external power source such as an AC adapter or a powered docking cradle that supplements and/or recharges a battery.

A client device 6B01 may optionally communicate with a base station, or directly with another computing device. A client device network interface 654 includes circuitry for coupling a client device 6B01 to one or more networks, and is constructed for use with one or more communication protocols and technologies including, but not limited to, global system for mobile communication (GSM), code division multiple access (CDMA), time division multiple access (TDMA), user datagram protocol (UDP), transmission control protocol/Internet protocol (TCP/IP), short message service (SMS), general packet radio service (GPRS), wireless access protocol (WAP), ultra wide band (UWB), IEEE 802.16 Worldwide Interoperability for Microwave Access (WiMax), session initiated protocol/real-time transport protocol (SIP/RTP), or any of a variety of other wireless communication protocols. Client device network interface 654 is sometimes known as a transceiver, a transceiving device, or a network interface card (NIC).

An audio interface 655 is arranged to produce and receive audio signals such as the sound of a human voice. For example, audio interface 655 may be coupled to a speaker and microphone to enable telecommunication with others and/or generate an audio acknowledgement for some action.

A client device display 656 may be a liquid crystal display (LCD), gas plasma, light emitting diode (LED), or any other type of display used with a computing device. A client device display 656 may also include a touch sensitive screen arranged to receive input from an object such as a stylus or a digit from a human hand.

A client device keypad 657 may comprise any input device arranged to receive input from a user. For example, client device keypad 657 may include a push button numeric dial, or a keyboard. A client device keypad 657 may also include command buttons that are associated with selecting and sending images.

An illuminator 658 may provide a status indication and/or provide light. Illuminator 658 may remain active for specific periods of time or in response to events. For example, when the illuminator 658 is active, it may backlight the buttons on client device keypad 657 and stay on while the client device is powered. Also, the illuminator 658 may backlight these buttons in various patterns when particular actions are performed such as dialing another client device. An illuminator 658 may also cause light sources positioned within a transparent or translucent case of the client device to illuminate in response to actions.

A video interface 659 is arranged to capture video images such as a still photo, a video segment, an infrared video or the like. For example, the video interface 659 may be coupled to a digital video camera, a web-camera or the like. A video interface 659 may comprise a lens, an image sensor, and other electronics. Image sensors may include a complementary metal-oxide-semiconductor (CMOS) integrated circuit, charge-coupled device (CCD), or any other integrated circuit for sensing light.

Some instances of the shown client device 6B01 comprise a client device IO interface 660 for communicating with external devices such as a headset, or other input or output devices not shown in FIG. 6B. The client device IO interface 660 can use one or more communication technologies such as a USB, infrared, Bluetooth™ port or the like. A haptic interface 661 is arranged to as a human interface device (HID) to facilitate interaction with a user of a client device. Such interaction can include tactile feedback to a user of the client device. For example, the haptic interface 661 may be employed to cause vibration of the client device 6B01 in a particular way (e.g., with a pattern or periodicity) and/or when interacting with one or another user.

A GPS transceiver 653 can determine the physical coordinates of client device 6B01 on the surface of the Earth. The GPS transceiver 653, in some embodiments, may be optional. The shown GPS transceiver 653 outputs a location such as a latitude value and a longitude value. However, the GPS transceiver 653 can also employ other geo-positioning mechanisms including, but not limited to, triangulation, assisted GPS (AGPS), enhanced observed time difference (E-OTD), cell identifier (CI), service area identifier (SAI), enhanced timing advance (ETA), base station subsystem (BSS) or the like, to determine the physical location of client device 6B01 on the surface of the Earth. It is understood that under different conditions, a GPS transceiver 653 can determine a physical location within millimeters for client device 6B01; and in other cases, the determined physical location may be less precise such as within a meter or significantly greater distances. In certain embodiments, the client device 6B01 may provide other information that may be employed to determine a physical location of the device including, for example, a media access control (MAC) address, IP address, IP port identifier, or the like.

The client device memory 642 includes random access memory 643, read-only memory 649, and other storage means. The client device memory 642 illustrates an example of computer readable storage media (devices) for storage of information such as computer readable instructions, data structures, program modules or other data. The client device memory 642 stores a basic IO system (BIOS) in the embodiment of client device BIOS 650 for controlling low-level operation of client device 6B01. The memory also stores an operating system 644 for controlling the operation of client device 6B01. It will be appreciated that this component may include a general-purpose operating system such as a version of UNIX, or LINUX™, or a specialized client communication operating system such as Microsoft Corporation's Windows Mobile™, Apple Corporation's iOS™ Google Corporation's Android™, or the Symbian® operating system. The operating system may include, or interface with a Java virtual machine module that enables control of hardware components and/or operating system operations via Java application programs.

The client device memory 642 further includes one or more instances of client device data storage 645, which can be used by client device 6B01 to store, among other things, client device applications 646 and/or other data. For example, client device data storage 645 may also be employed to store information that describes various capabilities of client device 6B01. The information may then be provided to another device based on any of a variety of events including being sent as part of a header during a communication, sent upon request or the like. Client device data storage 645 may also be employed to store social networking information including address books, buddy lists, aliases, user profile information or the like. Further, client device data storage 645 may also store messages, web page content, or any of a variety of content (e.g., received content, user generated content, etc.).

At least a portion of the information may also be stored on any component or network device including, but not limited, to a client device processor's readable storage media 652, a disk drive or other computer readable storage devices within client device 6B01, etc.

An instance of a client device processor's readable storage media 652 may include volatile, nonvolatile, removable, and non-removable media implemented in any method or technology for storage of information such as computer- or processor-readable instructions, data structures, program modules, or other data. Examples of computer readable storage media include RAM, ROM, electrically erasable programmable read-only memory (EEPROM), flash memory or other memory technology, Compact disc read-only memory (CD-ROM), digital versatile disks (DVD) or other optical storage, magnetic cassettes, magnetic tape, magnetic disk storage or other magnetic storage devices, or any other physical medium which can be used to store the desired information and which can be accessed by a computing device. The aforementioned readable storage media 652 may also be referred to herein as computer readable storage media.

The client device applications 646 may include computer executable instructions which, when executed by client device 6B01, transmit, receive, and/or otherwise process network data. The network data may include, but is not limited to, messages (e.g., SMS, multimedia message service (MMS), instant message (IM), email, and/or other messages), audio, video, and enable telecommunication with another user of another client device. Client device applications 646 may include, for example, a messenger 662, a browser 647, and other applications 648. Certain other applications 648 may include, but are not limited to, calendars, search programs, email clients, IM applications, SMS applications, voice over Internet protocol (VOIP) applications, contact managers, task managers, transcoders, database programs, word processing programs, security applications, spreadsheet programs, games, search programs, and so forth. In some embodiments, other applications 648 may collect and store user data that may be received from other computing devices in the environment.

A messenger 662 may be configured to manage a messaging session using any of a variety of messaging communications including, but not limited to email, SMS, IM, MMS, internet relay chat (IRC), Microsoft IRC (mIRC), really simple syndication (RSS) feeds, and/or the like. For example, in certain embodiments, the messenger 662 may be configured as an IM application such as AOL (America Online) instant messenger, Yahoo! messenger, .NET messenger server, ICQ or the like. In certain embodiments, the messenger 662 may be configured to include a mail user agent (MUA) such as Elm, Pine, message handling (MH), Outlook, Eudora, Mac Mail, Mozilla Thunderbird or the like. In another embodiment, the messenger 662 may be a client device application that is configured to integrate and employ a variety of messaging protocols including, but not limited, to various push and/or pull mechanisms for client device 6B01. In certain embodiments, the messenger 662 may interact with the browser 647 for managing messages. As used herein, the term "message" refers to any of a variety of messaging formats, or communications form including, but not limited to, email, SMS, IM, MMS, IRC or the like.

A browser 647 may include virtually any application configured to receive and display graphics, text, multimedia, messages and the like, employing virtually any web based language. In certain embodiments, the browser application is enabled to employ HDML, WML, WMLScript, JavaScript, SGML, HTML, XML and the like, to display and send a message. However, any of a variety of other web-based programming languages may be employed. In certain embodiments, a browser 647 may enable a user of client device 6B01 to communicate with another network device as may be present in the environment.

Figure 6C:
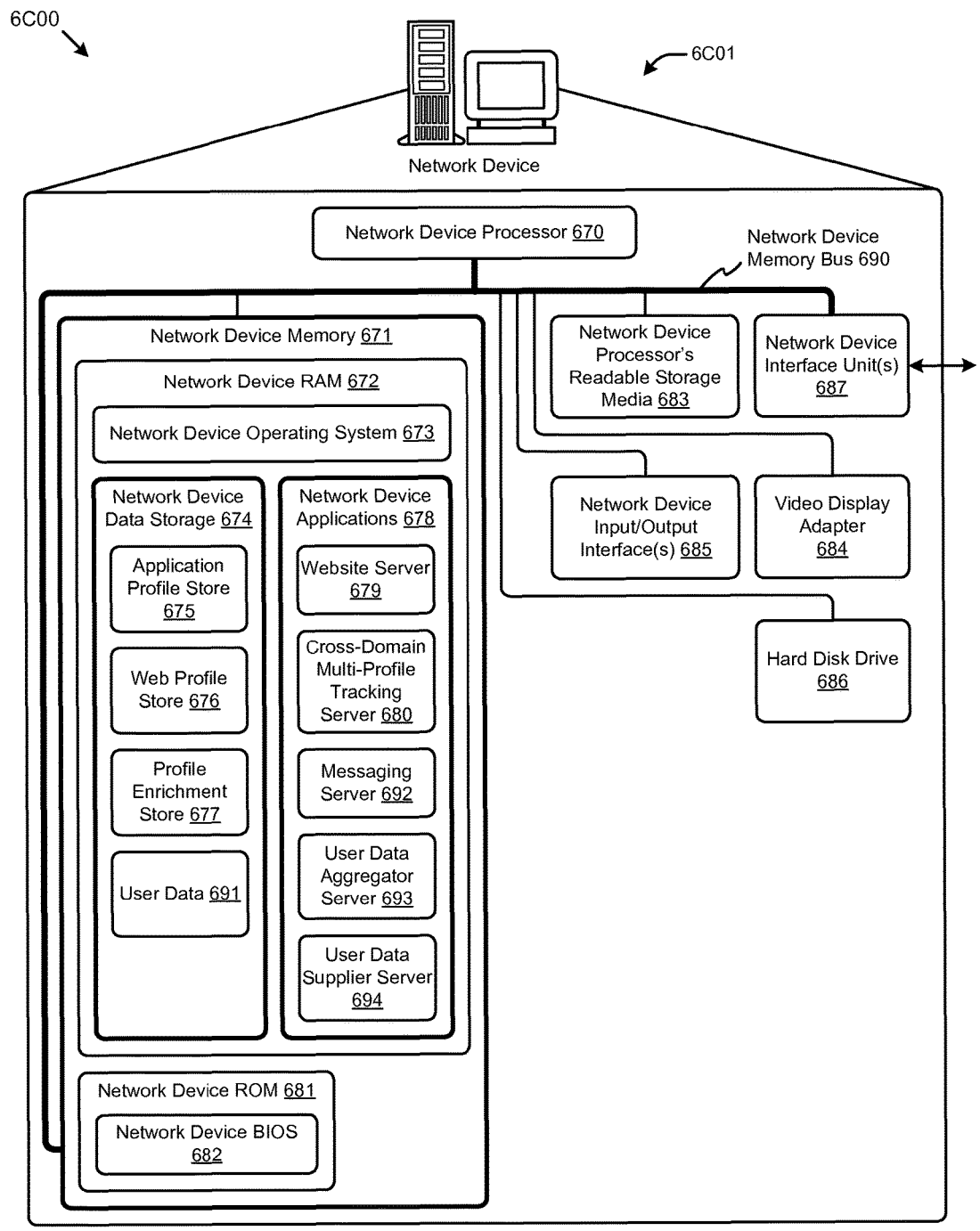

FIG. 6C depicts a block diagram 6C00 of an instance of a network device 6C01 that may be included in a system implementing instances of the herein-disclosed embodiments. Network device 6C01 may include many more or fewer components than those shown. Network device 6C01 may be configured to operate as a server, client, peer, a host, or any other device.

The network device 6C01 includes at least one instance of a network device processor 670, instances of readable storage media 683, network interface(s), a network device IO interface 685, a hard disk drive 686, a video display adapter 684, and a network device memory 671, all in communication with each other via a network device memory bus 690. The network device memory generally includes network device RAM 672, network device ROM 681. Some embodiments include one or more non-volatile mass storage devices such as a hard disk drive 686, a tape drive, an optical drive, and/or a floppy disk drive. The network device memory stores a network device operating system 673 for controlling the operation of network device 6C01. Any general-purpose operating system may be employed. A basic input/output system (BIOS) is also provided in the form of network device BIOS 682 for controlling the low-level operation of network device 6C01. As illustrated in FIG. 6C, a network device 6C01 also can communicate with the Internet, or some other communications network, via a network interface unit 687, which is constructed for use with various communication protocols including the TCP/IP protocol. The network interface unit 687 is sometimes known as a transceiver, a transceiving device, or a network interface card (NIC). Network device 6C01 also comprises a network device IO interface 685 for communicating with external devices such as a keyboard or other input or output devices.

A network device IO interface 685 can use one or more communication technologies such as USB, infrared, Bluetooth™ or the like.

The storage devices as described above may use various types of computer readable media, namely non-volatile computer readable storage media and/or a client device processor's readable storage media 683 and/or a network device processor's readable storage media 683. Such media may include any combinations of volatile, nonvolatile, removable, and non-removable media implemented in any method or technology for storage of information such as computer readable instructions, data structures, program modules, or other data. Examples of processor readable storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other media which can be used to store the desired information and which can be accessed by a computing device.

As shown, network device data storage 674 may include a database, text storage, a spreadsheet, a folder or directory hierarchy, a file or files or the like that may be configured to maintain and store user account identifiers, user profiles, email addresses, IM addresses, and/or other network addresses or the like. Network device data storage 674 may further include program code, data, algorithms and the like, for use by a processor such as a network device processor 670 to execute and perform actions. In certain embodiments, at least some of the logical contents of network device data storage 674 might be stored on another component of network device 6C01, such as on a second instance of hard disk drive 686 or on an external/removable storage device.

The network device data storage 674 may further store any portions of application data and/or user data such as an application profile store 675, a web profile store 676, a profile enrichment store 677 and/or any user data collected. In some embodiments, user data 691 may store unique user data, non-unique user data, aggregated user data, and/or any combination thereof. User data 691 may include a variety of attributes such as a five digit zip code, an expanded nine digit zip code and the like.

The Network device data storage 674 may also store program code and data. One or more network device applications 678 may be loaded into network device data storage or any other mass memory, to be accessible to run with or as a part of network device operating system 673. Examples of network device application programs may include transcoders, schedulers, calendars, database programs, word processing programs, hypertext transfer protocol (HTTP) programs, customizable user interface programs, IPSec applications, encryption programs, security programs, SMS message servers, IM message servers, email servers, account managers, and so forth. A messaging server 692, website server 679, user data aggregator server 693, a cross-domain multi-profile tracking server 680, and/or user data supplier server 694 may also be included within or implemented as application programs.

A messaging server 692 may include virtually any computing component or components configured and arranged to forward messages from message user agents and/or other message servers, or to deliver messages to a local message store such as network device data storage 674 or the like. Thus, a messaging server 692 may include a message transfer manager to communicate a message employing any of a variety of email protocols including, but not limited to, simple mail transfer protocol (SMTP), post office protocol (POP), Internet message access protocol (IMAP), network new transfer protocol (NNTP) or the like. A messaging server 692 may also be managed by one or more components of the messaging server 692. Thus, the messaging server 692 may also be configured to manage SMS messages; IM, MMS, IRC, or RSS feeds; mIRC; or any of a variety of other message types. In certain embodiments, the messaging server 692 may enable users to initiate and/or otherwise conduct chat sessions, VOIP sessions or the like.

A website server 679 may represent any of a variety of information and services that are configured to provide content, including messages, over a network to another computing device. Thus, a website server 679 can include, for example, a web server, a file transfer protocol (FTP) server, a database server, a content server or the like. A website server 679 may provide the content including messages over the network using any of a variety of formats including, but not limited to WAP, HDML, WML, SGML, HTML, XML, compact HTML (cHTML), extensible HTML (xHTML) or the like. A website server 679 may also be configured to enable a user of a client device to browse websites, upload user data, view and interact with advertisements or the like.

A user data aggregator server 693 is configured to aggregate user data to be provided to user data buyers for advertising campaigns. In certain embodiments, a user data aggregator server 693 may be configured to receive collected user data from a user data supplier server 694. In some embodiments, a user data aggregator server 693 may receive a query for user data. Based on the query, a user data aggregator server 693 may generate a plurality of subsets of aggregated user data. In some embodiments, user data aggregator server 693 may be included in a network device.

A user data supplier server 694 is configured to collect user data. In certain embodiments, the user data supplier server 694 may be configured to provide the collected user data to user data aggregator server 693. In some embodiments, the user data supplier server 694 may collect and/or provide unique user data and/or non-unique user data. In certain embodiments, the user data supplier server 694 may aggregate the collected user data. In some embodiments, the user data supplier server 694 may be included in any computing device such as heretofore described.

Returning to discussion of the heretofore introduced environments, the environments includes components with which various systems can be implemented. Not all of the components shown may be required to practice the embodiments, and variations in the arrangement and type of the components may be made without departing from the spirit or scope of the disclosure.

Various environment in which embodiments of the disclosure operate may include local area networks (LANs)/ wide area networks (WANs), wireless networks, client devices (e.g., user stations). The overall network, including any sub-networks and/or wireless networks, are in communication with, and enables communication between components in the environment.

Instances of client devices may include virtually any computing device capable of communicating over a network to send and receive information, including instant messages, performing various online activities or the like. It should be recognized that more or fewer client devices may be included within a system such as described herein, and embodiments are therefore not constrained by the number or type of client devices employed.

Devices that may operate as client devices may include devices that can connect using a wired or wireless communications medium such as personal computers, servers, multiprocessor systems, microprocessor-based or programmable consumer electronics, network PCs or the like. In some embodiments, client devices may include virtually any portable computing device capable of connecting to another computing device and receiving information such as a laptop computer, a smart phone, a tablet computer, or the like. Portable or mobile computer devices are may also include or operate in conjunction with other portable devices such as cellular telephones, display pagers, radio frequency (RF) devices, infrared (IR) devices, personal digital assistants (PDAs), handheld computers, wearable computers integrated devices combining one or more of the preceding devices and the like. As such, client devices can range widely in terms of capabilities and features. Moreover, client devices may provide access to various computing applications including a browser or other web-based applications. A web-enabled client device may include a browser application that is configured to receive and to send web pages, web-based messages and the like. The browser application may be configured to receive and display graphics, text, multimedia and the like, employing virtually any web-based language including a wireless application protocol messages (WAP) and the like. In certain embodiments, the browser application is enabled to employ handheld device markup language (HDML), wireless markup language (WML), WMLScript, JavaScript, standard generalized markup language (SGML), HyperText markup language (HTML), eXtensible markup language (XML) and the like, to display and send a message. In certain embodiments, a user of the client device may employ the browser application to perform various activities over a network (online). However, another application may also be used to perform various online activities.

Client devices may include at least one client application that is configured to receive and/or send data between another computing device (e.g., a server component). The client application may include a capability to provide send and/or receive content or the like. The client application may further provide information that identifies itself including a type, capability, name or the like. In certain embodiments, a client device may uniquely identify itself through any of a variety of mechanisms including a phone number, mobile identification number (MIN), an electronic serial number (ESN), or other mobile device identifier. The information may also indicate a content format that the mobile device is enabled to employ. Such information may be provided in a network packet or the like, sent between other client devices, or sent between other computing devices.

Client devices may be further configured to include a client application that enables an end-user to log into an end-user account that may be managed by another computing device. Such end-user accounts, in one non-limiting example, may be configured to enable the end-user to manage one or more online activities including, in one non-limiting example, search activities, social networking activities, browse various websites, communicate with other users, participate in gaming, interact with various applications or the like. However, participation in online activities may also be performed without logging into the end-user account.

A wireless communication capability is configured to couple client devices and other components with network. Wireless network may include any of a variety of wireless sub-networks that may further overlay stand-alone and/or ad-hoc networks and the like, to provide an infrastructure-oriented connection for client devices. Such sub-networks may include mesh networks, wireless LAN (WLAN) networks, cellular networks and the like. In certain embodiments, the system may include more than one wireless network.

A wireless network may further include an autonomous system of terminals, gateways, routers, mobile network edge devices and the like which may be connected by wireless radio links, etc. Connections may be configured to move freely and randomly and organize themselves arbitrarily such that the topology of a wireless network may change rapidly. A wireless network may further employ a plurality of access technologies including AMPS and/or second generation (2G), and/or third generation (3G), and/or fourth generation (4G) generation radio access for cellular systems, WLAN, wireless router (WR) mesh and the like. The foregoing access technologies as well as emerging and/or future access technologies may enable wide area coverage for mobile devices such as client devices with various degrees of mobility. In one non-limiting example, wireless network may enable a radio connection through a radio network access such as a global system for mobile (GSM) communication, general packet radio services (GPRS), enhanced data GSM environment (EDGE), wideband code division multiple access (WCDMA) and the like. A wireless network may include any wireless communication mechanism by which information may travel between client devices and/or between any other computing devices and/or over or between other networks or network components.

Any of the foregoing networks can be configured to couple network devices with other computing devices and communication can include communicating over the Internet. In some situations communication is carried out using combinations of LANs, WANs, as well as direct connections such as through a universal serial bus (USB) port, other forms of computer readable media. On an interconnected set of LANs, including those based on differing architectures and protocols, a router acts as a link between LANs, enabling messages to be sent from one to another. In addition, communication links within LANs may include twisted wire pair or coaxial cable, while communication links between networks may use analog telephone lines, full or fractional dedicated digital lines including T1, T2, T3, and T4, and/or other carrier mechanisms including, for example, E-carriers, integrated services digital networks (ISDNs), digital subscriber lines (DSLs), wireless links including satellite links, or other communications links known to those skilled in the art. Moreover, communication links may further employ any of a variety of digital signaling technologies including, without limit, for example, DS-0, DS-1, DS-2, DS-3, DS-4, OC-3, OC-12, OC-48 or the like. Furthermore, remote computers and other related electronic devices can be remotely connected to either LANs or WANs via a modem and temporary telephone link. In various embodiments, network 108 may be configured to transport information of an Internet protocol (IP). In some cases, communication media carries computer readable instructions, data structures, program modules, or other transport mechanism and includes any information delivery media. By way of example, communication media includes wired media such as twisted pair, coaxial cable, fiber optics, wave guides, and other wired media and wireless media such as acoustic, RF, infrared, and other wireless media.

In the foregoing specification, the disclosure has been described with reference to specific embodiments thereof. It will, however, be evident that various modifications and changes may be made thereto without departing from the broader spirit and scope of the disclosure. For example, the above-described process flows are described with reference to a particular ordering of process actions. However, the ordering of many of the described process actions may be changed without affecting the scope or operation of the disclosure. The specification and drawings to be regarded in an illustrative sense rather than in a restrictive sense.

What is claimed is:

1. A method comprising:
receiving, by a matching server over a network, a first electronic message, the first electronic message comprising a first record object including a value for each of a plurality of fields, wherein the plurality of fields include at least one first obfuscated representation of personally identifiable information, at least one first identifiable user attribute comprising non-personally identifiable information, and at least one first attribute field, the at least one first attribute field including a null value;
receiving, by the matching server over the network, a second electronic message, the second electronic message comprises a second record object including a value for each of a plurality of fields, wherein the plurality of fields include at least one second obfuscated representation of personally identifiable information, at least one second identifiable user attribute, and at least one second attribute field, the at least one second attribute field including a null value;
determining, by the matching server, an equivalence between the at least one first obfuscated representation of personally identifiable information and the at least one second obfuscated representation of personally identifiable information, the equivalence indicating that the first record object and the second record object are associated with a same user;
associating, by the matching server, the first record object with the second record object such that the at least one first identifiable user attribute is associated with the at least one second identifiable user attribute;
receiving, by the matching server over the network, a third electronic message, the third electronic message comprises a third record object including a value for each of a plurality of fields, wherein the plurality of fields include at least one third obfuscated representation of personally identifiable information, at least one third identifiable user attribute, and at least one third attribute field, the at least one third attribute field including a non-null parameter value;
determining, by the matching server, an equivalence between the at least one third identifiable user attribute and the at least one second identifiable user attribute;
associating, by the matching server, the third record object with the first and second record objects based on determining that the at least one second identifiable user attribute is equivalent to the at least one third identifiable user attribute, wherein associating the third record object with the first and second record objects causes the at least one first attribute field and the at least one second attribute field to be associated with the non-null parameter value of the at least one third attribute field; and
transmitting, by the matching server, a content object to a client device associated with the first record object, the content object generated based on the non-null parameter value of the at least one third attribute field.

2. The method of claim 1, further comprising generating a data record comprising at least the first obfuscated representation of personally identifiable information and the at least one second identifiable user attribute, then sending the data record over the network.

3. The method of claim 2, wherein a user corresponding to the first obfuscated representation of personally identifiable information is known by a first data participant and a user corresponding to the second obfuscated representation of personally identifiable information is not known by the first data participant, and wherein associating the first record object with the second record object provides an indication that the user corresponding to the first obfuscated representation of personally identifiable information and the user corresponding to the second obfuscated representation of personally identifiable information represent a same user.

4. The method of claim 1, further comprising generating a data record comprising at least the second obfuscated representation of personally identifiable information and the at least one first identifiable user attribute, then sending the data record over the network.

5. The method of claim 1, wherein the first electronic message is received from a first participant of a match cooperative and wherein the second electronic message is received from a second participant of the match cooperative.

6. The method of claim 1, wherein the first obfuscated representation of personally identifiable information is generated in response to executing a set of obfuscation programming instructions on a client device of a user corresponding to first obfuscated representation of personally identifiable information.

7. The method of claim 6, further comprising sending the set of obfuscation programming instructions to the client device, the set of obfuscation programming instructions to operate over personally identifiable information pertaining to the user.

8. The method of claim 7, wherein executing the set of obfuscation programming instructions comprises at least one of a normalizing operation to normalize the personally identifiable information pertaining to the user or an obfuscation operation to obfuscate the personally identifiable information pertaining to the user, or a combination therefrom.

9. The method of claim 8, wherein the obfuscation operation is performed according to at least one of an MD5 hashing algorithm using a first seed or an SHA256 hashing algorithm using a first seed, or a combination therefrom.

10. The method of claim 1, wherein the first electronic message further comprises an obfuscation version identifier.

11. A non-transitory computer-readable medium including stored thereon a sequence of instructions which, when executed by a processor causes the processor to execute a process, the process comprising:
receiving a first electronic message, the first electronic message comprises a first record object including a value for each of a plurality of fields, wherein the plurality of fields include at least one first obfuscated representation of personally identifiable information, at least one first identifiable user attribute comprising non-personally identifiable informational, and at least one first attribute field, the at least one first attribute field including a null value;
receiving a second electronic message, the second electronic message comprises a second record object including a value for each of a plurality of fields, wherein the plurality of fields include at least one second obfuscated representation of personally identifiable information, at least one second identifiable user attribute, and at least one second attribute field, the at least one second attribute field including a null value;

determining an equivalence between the at least one first obfuscated representation of personally identifiable information and the at least one second obfuscated representation of personally identifiable information, the equivalence indicating that the first record object and the second record object are associated with a same user;

associating the first record object with the second record object such that the at least one first identifiable user attribute is associated with the at least one second identifiable user attribute;

receiving a third electronic message, the third electronic message comprises a third record object including a value for each of a plurality of fields, wherein the plurality of fields include at least one third obfuscated representation of personally identifiable information, at least one third identifiable user attribute, and at least one third attribute field, the at least one third attribute field including a non-null parameter value;

determining an equivalence between the at least one third identifiable user attribute and the at least one second identifiable user attribute;

associating the third record object with the first and second record objects based on determining that the at least one second identifiable user attribute is equivalent to the at least one third identifiable user attribute, wherein associating the third record object with the first and second record objects causes the at least one first attribute field and the at least one second attribute field to be associated with the non-null parameter value of the at least one third attribute field; and transmitting a content object to a client device associated with the first record object, the content object generated based on the non-null parameter value of the at least one third attribute field.

12. The non-transitory computer-readable medium of claim 11, further comprising generating a data record comprising at least the first obfuscated representation of personally identifiable information and the at least one second identifiable user attribute then transmitting the data record over a network.

13. The non-transitory computer-readable medium of claim 12, wherein a user corresponding to the first obfuscated representation of personally identifiable information is known by a first data participant and a user corresponding to the second obfuscated representation of personally identifiable information is not known by the first data participant, and wherein associating the first record object with the second record object provides an indication that the user corresponding to the first obfuscated representation of personally identifiable information and the user corresponding to the second obfuscated representation of personally identifiable information represent a same user.

14. The non-transitory computer-readable medium of claim 11, further comprising generating a data record comprising at least the second obfuscated representation of personally identifiable information and the at least one first identifiable user attribute, then transmitting the data record over a network.

15. The non-transitory computer-readable medium of claim 11, wherein the first electronic message is received from a first participant of a match cooperative and wherein the second electronic message is received from a second participant of the match cooperative.

16. The non-transitory computer-readable medium of claim 11, wherein the first obfuscated representation of personally identifiable information is generated in response to executing a set of obfuscation programming instructions on a client device of a user corresponding to first obfuscated representation of personally identifiable information.

17. The non-transitory computer-readable medium of claim 16, further comprising sending the set of obfuscation programming instructions to the client device, the set of obfuscation programming instructions to operate over personally identifiable information pertaining to the user.

18. The non-transitory computer-readable medium of claim 17, wherein executing the set of obfuscation programming instructions comprises at least one of a normalizing operation to normalize the personally identifiable information pertaining to the user or an obfuscation operation to obfuscate the personally identifiable information pertaining to the user, or a combination therefrom.

19. A system comprising:
a processor;
one or more memories;
a network interface to receive:
  a first electronic message, wherein the first electronic message comprises a first record object including a value for each of a plurality of fields, wherein the plurality of fields include at least one first obfuscated representation of personally identifiable information, at least one first identifiable user attribute comprising non-personally identifiable information, and at least one first attribute field, the at least one first attribute field including a null value;
  a second electronic message, wherein the second electronic message comprises a second record object including a value for each of a plurality of fields, wherein the plurality of fields include at least one second obfuscated representation of personally identifiable information, at least one second identifiable user attribute, and at least one second attribute field, the at least one second attribute field including a null value; and
  a third electronic message, the third electronic message comprises a third record object including a value for each of a plurality of fields, wherein the plurality of fields include at least one third obfuscated representation of personally identifiable information, at least one third identifiable user attribute, and at least one third attribute field, the at least one third attribute field including a non-null parameter value;
a non-transitory computer readable medium, the non-transitory computer readable medium including stored thereon a sequence of instructions which, when executed by the processor causes the processor to execute operations including:
  determining an equivalence between the at least one first obfuscated representation of personally identifiable information of the first record object and the at least one second obfuscated representation of personally identifiable information of the second record object;
  determining an equivalence between the at least one second identifiable user attribute of the second record object and the at least one third identifiable user attribute of the third record object; and
  associating the first record object with the second record object based on determining an equivalence between the at least one first obfuscated representation of personally identifiable information and the at least one second obfuscated representation of personally identifiable information, wherein associating the first and second record objects causes the at least one first identifiable user attribute to be associated with the at least one second identifiable user attribute;

associating the third record object with the first and second record objects based on determining that the at least one second identifiable user attribute is equivalent to the at least one third identifiable user attribute, wherein associating the third record object with the first and second record objects causes the at least one first attribute field and the at least one second attribute field to be associated with the non-null parameter value of the at least one third attribute field; and transmitting a content object to a client device associated with the first record object, the content object determined based on the non-null parameter value of the at least one third attribute field.

20. The system of claim 19, wherein the operations further include generating a data record comprising at least the first obfuscated representation of personally identifiable information and the at least one second identifiable user attribute.

21. A method comprising:

receiving, by a match cooperative server, from a first participant, a first masked representation of an email alias;

receiving, by the match cooperative server and from the first participant, a first set of cookie data, wherein the first set of cookie data comprises at least a portion of a cookie associated with the email alias;

receiving, by the match cooperative server and from a second participant, a second masked representation of an email alias;

receiving, by the match cooperative server, a second set of cookie data, wherein the second set of cookie data comprises at least a portion of the cookie that is different from the portion of the cookie of the first set of cookie data;

determining an equivalence between the first masked representation of the email alias and the second masked representation of the email alias; and associating the at least a portion of the cookie that is different from the portion of the cookie of the first set of cookie data with the first masked representation of the email alias;

receiving, by the match cooperative server and from a third participant, a third masked representation of an email alias;

receiving, by the match cooperative server, a third set of cookie data, the third set of cookie data including a first subset and a second subset, wherein the first subset is different from the first set of cookie data and the second set of cookie data;

determining an equivalence between the second subset of the third set of cookie data and at least a portion of the second set of cookie data;

associating the first subset of the third set of cookie data with the first masked representation of the email alias;

transmitting a first data record to the first participant, the first data record generated based on the first subset of the third set of cookie data.

22. The method of claim 21, wherein the first data record comprises at least a portion of the cookie that is different from the portion of the cookie of the first set of cookie data.

23. The method of claim 22, wherein the first data record further comprises the first masked representation of the email alias.

24. The method of claim 21, further comprising associating the at least a portion of first set of cookie data with the second masked representation of the email alias.

25. The method of claim 24, further comprising sending a second data record over a network to the second participant, wherein the second data record comprises at least a portion of the first set of cookie data.

26. The method of claim 25, wherein the second data record further comprises the second masked representation of the email alias.

* * * * *